United States Patent [19]

Omura et al.

[11] Patent Number: 4,509,186

[45] Date of Patent: Apr. 2, 1985

[54] METHOD AND APPARATUS FOR SPEECH MESSAGE RECOGNITION

[75] Inventors: Koichi Omura, Osaka; Hiroyoshi Yuasa, Hirakata, both of Japan

[73] Assignee: Matsushita Electric Works, Ltd., Osaka, Japan

[21] Appl. No.: 336,055

[22] Filed: Dec. 31, 1981

[51] Int. Cl.³ .............................. G10L 1/00
[52] U.S. Cl. ................................... 381/43
[58] Field of Search ................ 364/513.5; 381/41–45

[56] References Cited

U.S. PATENT DOCUMENTS

| | | | |
|---|---|---|---|
| 3,261,916 | 7/1966 | Bakis | 381/44 |
| 3,450,989 | 6/1969 | Dickenson | 381/41 |
| 3,679,830 | 7/1972 | Uffelman et al. | 381/41 |
| 3,846,586 | 11/1974 | Griggs | 381/44 |
| 3,946,157 | 3/1976 | Dreyfus | 179/1 SA |
| 4,297,528 | 10/1981 | Beno | 381/45 |

Primary Examiner—E. S. Matt Kemeny
Attorney, Agent, or Firm—Burns, Doane, Swecker & Mathis

[57] ABSTRACT

Speech recognition by first log-compressing the speech signal, then filtering into subband signals which are subtracted to form an indicator of voiced, unvoiced and silence intervals, whereby sequence and duration patterns are coded in $+1$, $-1$, and zero.

48 Claims, 43 Drawing Figures

Fig. 20A   Fig. 20B
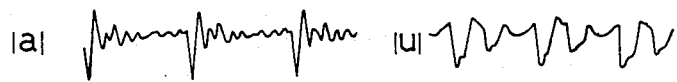
Fig. 21A   Fig. 21B
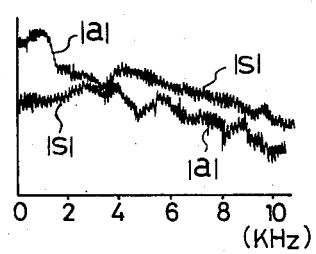 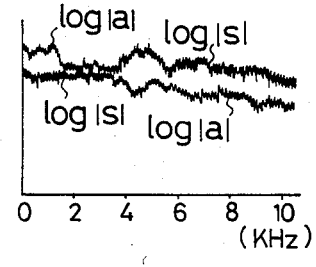
Fig. 22
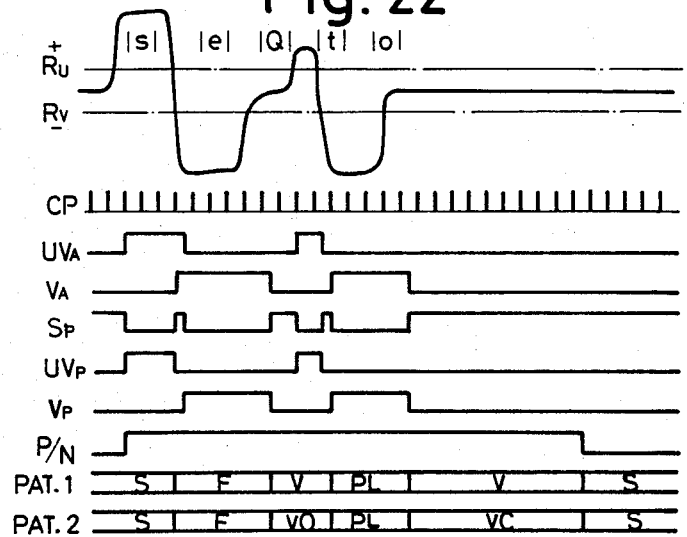

POINTS OF ARTICULIATION
FOR /a/ /e/ /i/ /o/ /u/

$F_1-F_2$ RELATION OF
VOWELS /a/ /e/ /i/ /o/ /u/

$F_1-F_2$ RELATION OF
JAPANESE VOWELS

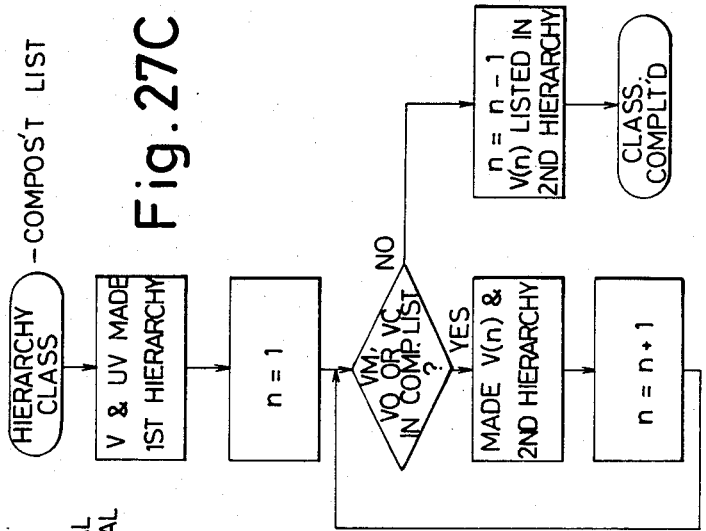
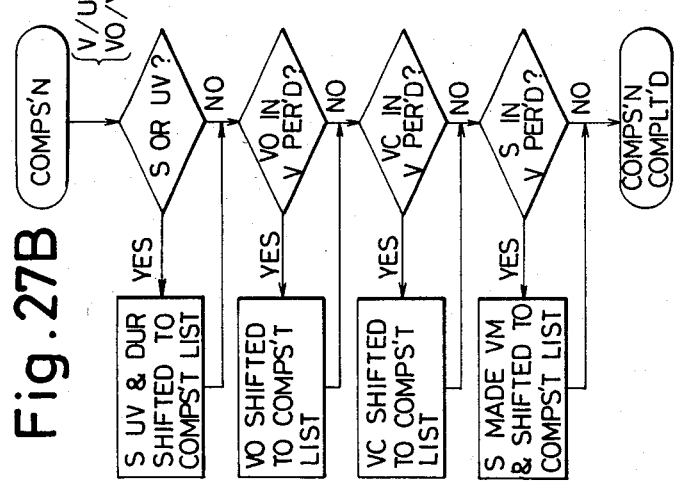

|  | l | s |  | e | n | a |  | k |  | a | o |  | s |  | a |  | s |  | u | r | e | l |  |
|---|---|---|---|---|---|---|---|---|---|---|---|---|---|---|---|---|---|---|---|---|---|---|---|
|  | UV | S |  | $V_{(1)}$ | S | UV | S |  | $V_{(2)}$ | S | UV | S | $V_{(3)}$ | S | UV | S | $V_{(4)}$ |

⟨V/UV⟩           1383 188 3415 963 20 230 3621 94 930 132 1437 69 1387 117 2637 16623

DURATION { SAMPLED      83  11  205  57  1  13  217  5  55   7   86   4   83   7  158 (1000)
           NORMALIZD

⟨$V_{(1)}$⟩    VM  VC  VM  VO  VM  VC  VM

DURATION { SAMPLED    109 1630 117 955 268 331  5           3415
           NORMALIZD   31  477  34 279  78  96  1          (1000)

⟨$V_{(2)}$⟩    VM  VO  VM  VC

DURATION { SAMPLED    488 2223 274 636                     3621
           NORMALIZD  134  613  75 175                    (1000)

⟨$V_{(3)}$⟩    VM  VC

DURATION { SAMPLED     96 1341                             1437
           NORMALIZD   66  933                            (1000)

⟨$V_{(4)}$⟩    VM  VC  VM  VC

DURATION { SAMPLED     43 1902 431 261                     2637
           NORMALIZD   16  721  16  98                    (1000)

Fig. 28

METHOD AND APPARATUS FOR SPEECH MESSAGE RECOGNITION

This invention relates to a method and apparatus for speech message recognition wherein control signals for controlling operations of such controlled machine or device as, for example, a massager, automatic door or the like are generated by phonetic analysis of speech messages.

For the method and apparatus of the kind referred to, there has been known already a technique disclosed in, for example, U.S. Pat. No. 3,946,157 dated Mar. 23, 1976, in which time variations in speech energy E of the message collected through a microphone is measured at a predetermined frequency band (200 to 3400 Hz), the time derivative dE/dt of the variation in the energy E is measured and, in addition, energy distributions $E_B$, $E_M$ and $E_H$ in respective frequency bands of 200 to 800 Hz, 800 to 1600 Hz and 1600 to 3400 Hz of the message are measured. When there is the energy E while the pulse of dE/dt is low and a high pulse is present in $E_H$, the voice is discriminated to be /S/, that is, a silent fricative. When there is the energy E while the pulse of dE/dt is high and a high pulse is present in $E_H$, the voice is discriminated to be /T/, that is, a silent explosive. When there is the energy E and a high pulse is present in $E_M$, the voice is discriminated to be /A/, that is, a voiced medium vowel. In the presences of the energy E and high pulse of $E_B$, the voice is discriminated to be /0/, that is, a voiced low vowel. Further when there is the energy E and a high pulse is present simultaneously in $E_B$ and $E_H$, the voice is discriminated to be /I/, that is, a voiced high vowel. These discriminations are carried out in a first logic circuit, and contents of the entire speech message are recognized by comparing outputs of the first logic circuit with a code table in a second logic circuit. With this arrangement, however, a differential circuit is required in the circuit and, in addition, when a nasal consonant /N/, a whispered message or the like must be recognized, the energy of the speech message is required to be measured at each of a larger number of frequency bands. Thus, the known technique has been defective in many respects. Further, when the speech message is given in a sentence consisting of a plurality of words, it has teen unable to be treated by this technique.

A primary object of the present invention is, therefore, to provide a method and apparatus for speech message recognition wherein whether respective phonemes contained in a speech message are voiced sounds or unvoiced sounds is discriminated and, in the case of the voiced sounds only, contents of the message can be recognized by means of only four signals obtained by discriminating if the sounds are open or closed voices.

Another object of the present invention is to provide a method and apparatus for speech message recognition wherein a speech message is given to a plurality of filter banks respectively of different passing frequency bands and discriminations are performed in respect of whether the message is of voiced or unvoiced sounds and, in the case of voiced sounds, whether they are open or closed voices, by means of subtractions between respective outputs of the filter banks.

A related object of the present invention is to provide a method and apparatus for speech message recognition wherein a speech message is given to a plurality of filter banks respectively of different passing frequency bands and, for signals obtained by means of subtractions between respective outputs of the filter banks, the voiced and unvoiced sound signals having signals of voiced or unvoiced sounds are treated at the first hierarchy and the open and closed voice signals having signals of open or closed voices are treated in the second hierarchy to thereby quickly carry out the recognizing operation.

A further related object of the present invention is to provide a method and apparatus for speech message recognition wherein a speech message is given to a plurality of filter banks respectively of different passing frequency bands and, for signals obtained by means of subtractions between respective outputs of the filter banks, the voiced and unvoiced sound signals having signals of voiced or unvoiced sounds are converted into three values at the first hierarchy, and the open and closed voice signals are converted into three values at the second hierarchy, whereby the subsequent treatments can be made easier.

Another related object of the present invention is to provide a method and apparatus for speech message recognition wherein a speech message is given to a plurality of filter banks respectively of a different passing frequency band, thus including a first filter bank having a frequency band of 0 to 1 KHz to which energies of voiced sounds concentrate and a second filter bank having a frequency band of 2 to 12 KHz to which energies of unvoiced sounds concentrate, voiced and unvoiced sound signals are made by means of a subtraction between respective outputs of the first and second filter banks, voiced, unvoiced and silent sound signals are generated respectively in the case when the voiced and unvoiced sound signals are exceeding a predetermined value, less than another predetermined value or between the two predetermined values, and these three signals are compared with preliminarily stored reference patterns so that the contents of the speech message can be recognized.

Still another related object of the present invention is to provide a method and apparatus for speech message recognition wherein respective durations of the foregoing three signals, that is, the voiced, unvoiced and silent sound signals are measured, and existing patterns of the three signals and patterns of the measured durations are compared respectively with reference patterns so as to improve the recognizing precision.

Still another object of the present invention is to provide a method and apparatus for speech message recognition wherein, in order that a speech message can be correctly recognized irrespective of a presence or absence of an unvoiced sound signal following a silent sound signal, a reference pattern in which the unvoiced sound signal follows as well as a reference pattern in which the unvoiced sound signal does not follow are prepared with respect to a reference pattern having silent sound signals, whereby any influence due to phonetic difference between individual speakers and the like in the speech message can be eliminated and the general utility of the method and apparatus can be assured.

Another object of the present invention is to provide a method and apparatus for speech message recognition wherein a speech message is given to a plurality of filter banks respectively of a different passing frequency band, thus including a first filter bank passing a frequency band of 0 to 500 Hz to which energies of medium and closed voices in voiced sounds concentrate and a second filter bank passing a frequency band of 0.5 to 1 KHz to which energies of medium and open voices in voiced sounds concentrate, open and closed voice signals are obtained by means of subtractions between respective outputs of the first and second filter banks, further open, closed and silent voice signals are generated respectively in response to the case where the open and closed voice signals exceed a predetermined value, are less than another predetermined value or are between the two both predetermined values, and these three signals are compared with reference patterns preliminarily stored so as to recognize the contents of the speech message.

Another related object of the present invention is to provide a method and apparatus for speech message recognition wherein respective durations of the foregoing three signals, that is, the open, closed and silent voice signals are measured and existing patterns of the three signals and patterns of the durations are compared respectively with reference patterns to thereby improve the recognizing precision.

Yet another object of the present invention is to provide a method and apparatus for speech message recognition wherein a speech message is given to a plurality of filter banks respectively of a different passing frequency band, thus including a first filter bank of 0 to 1 KHz to which energies of voiced sounds concentrate, second filter bank of 2 to 12 KHz to which energies of unvoiced sounds concentrate, third filter bank of 0 to 500 Hz to which energies of closed voices of voiced sounds concentrate and fourth filter bank of 0.5 to 1 KHz to which energies of open voices of voiced sounds concentrate, voiced and unvoiced sound signals are obtained by means of subtractions between respective outputs of the first and second filter banks so that voiced, unvoiced and silent sound signals are generated respectively in response to the case where the voiced and unvoiced sound signals exceed a predetermined first value, less than a predetermined second value or between the both first and second values, open and closed voice signals are made by means of subtractions between respective outputs of the third and fourth filter banks so that open, closed and silent voice signals are generated respectively in response to the case where the open and closed voice signals exceed a predetermined third value, less than a predetermined fourth value or between the third and fourth values, a further open voice signal is made when the voiced sound signal and open voice signal are simultaneously present, a further closed voice signal is made when the voiced sound signal and closed voice signal are simultaneously present, a further medium voice signal is made when the voiced sound signal and silent voice signal are simultaneously present and, as a result, contents of the speech message are recognized by comparing the five signals of the further open voice signal, further closed voice signal, further medium voice signal, silent sound signal and unvoiced sounds signal with preliminarily stored reference patterns.

A related object of the present invention is to provide a method and apparatus for speech message recognition as referred to immediately above wherein the said five signals are compared sequentially with the said reference patterns.

Still another related object of the present invention is to provide a method and apparatus for speech message recognition as referred to immediately above wherein the said five signals as well as the durations of the respective five signals are compared sequentially with the reference patterns.

Other objects and advantages of the present invention shall become apparent from the following disclosure of the invention detailed with reference to certain preferred embodiments shown in attached drawings, in which:

FIGS. 20 through 22 are diagrams for explaining operations of the circuit of FIG. 19;

FIGS. 24 to 26 are circuit diagrams of further examples of the apparatus shown in FIG. 14, wherein

FIGS. 27A to 27E are flow charts of respective other examples of the recognizing method of the present invention;

FIG. 28 is a diagram for explaining more in detail the operations of the methods shown in FIGS. 27C and 27D, with the speech message /senakaosasure/ employed;

Figure 29:
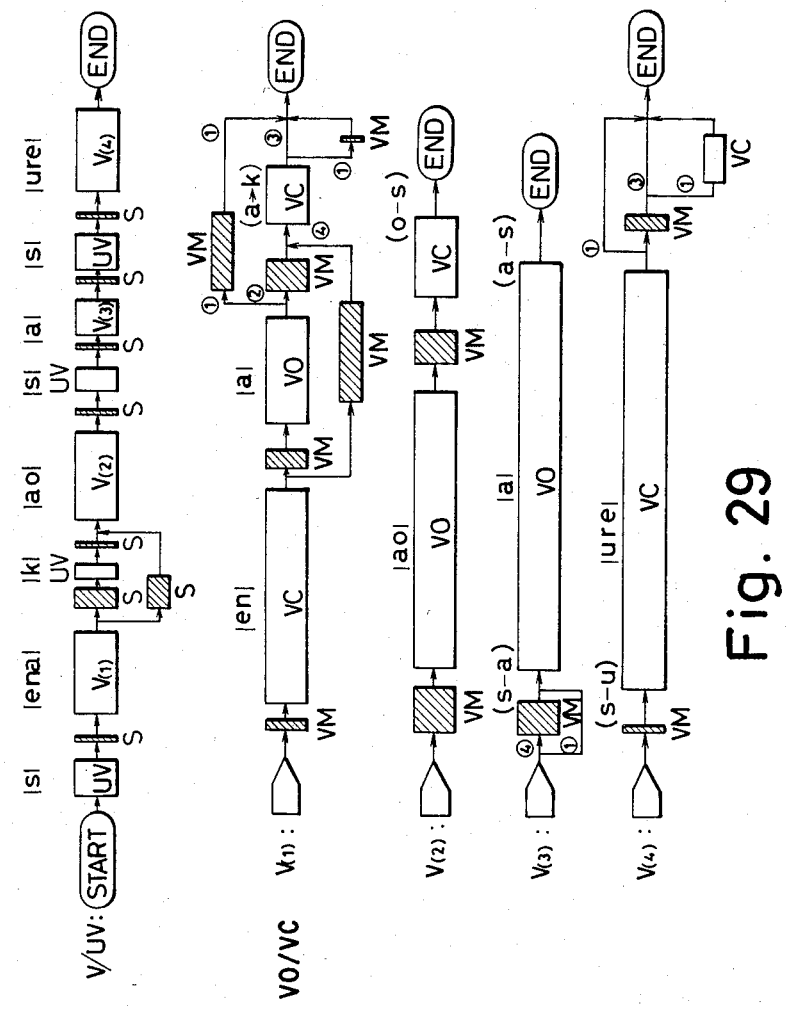
Figure 30:
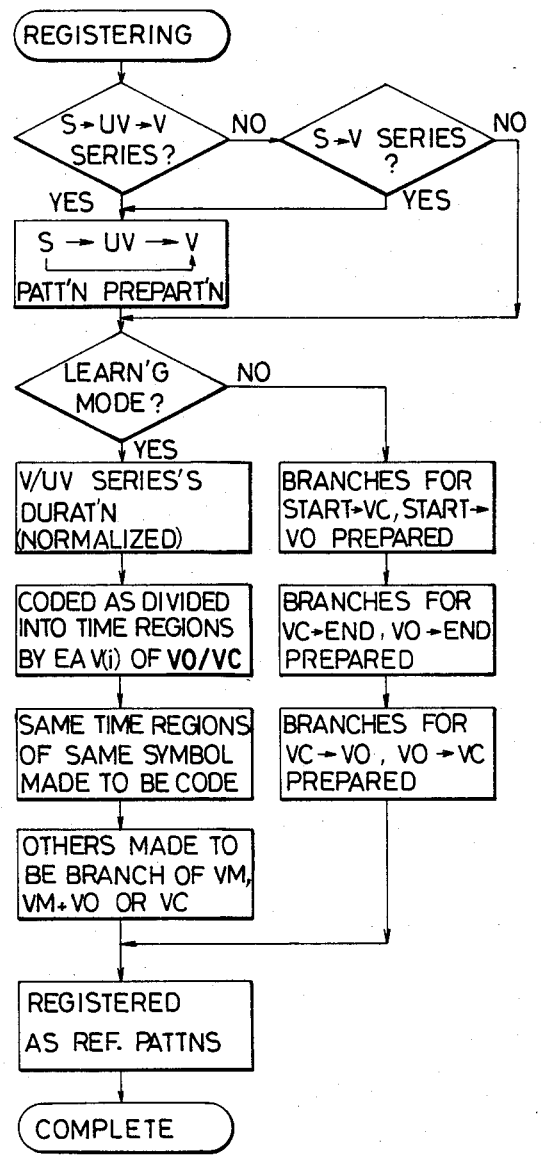
Figure 31:
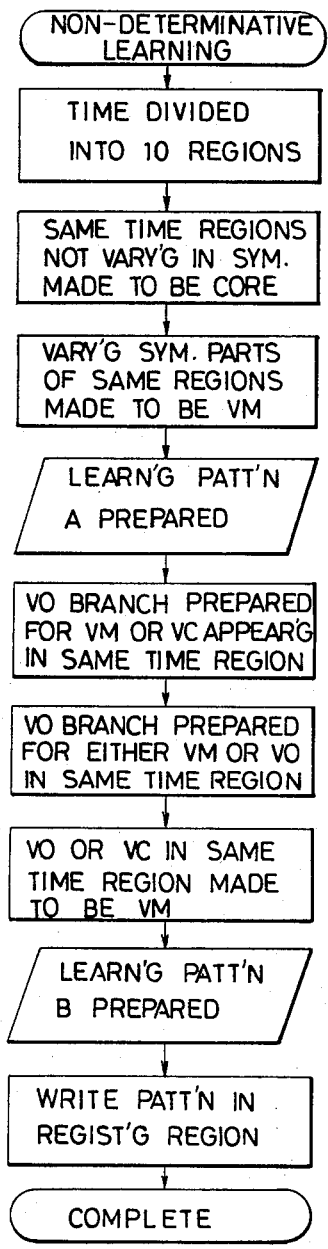
Figure 32A:
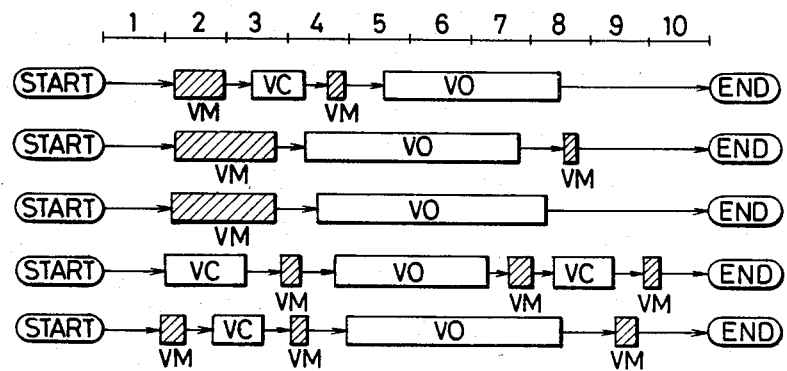
Figure 32B:
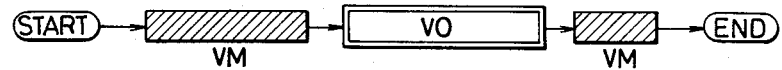
Figure 32C:
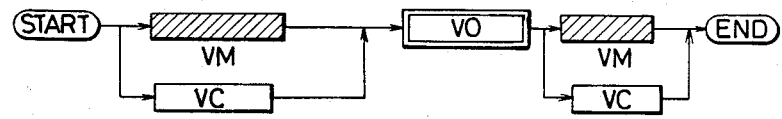

FIG. 29 show diagrammatically phoneme patterns of the message /senakaosasure/, wherein "V/UV" is of the case indicated only by voiced, unvoiced and silent sounds V, UV and S, "V(1)" to "V(4)" are of more specific patterns of respective voiced sounds V in the message, encircled numerals on the respective routes indicate phonation frequencies in the case of sequential five phonations, the lateral length of respective frames show normalized durations of voices, and hatched portions show respective periods of silent sounds S and medium voices VM occurring in transitions from one phoneme to the other;

FIG. 30 is an explanatory view for the reference pattern preparation in the present invention;

FIG. 31 is a flow chart showing in detail a part of the preparatory step for the reference patterns shown in FIG. 30 of the present invention;

FIGS. 32A to 32C are explanatory views for the flow chart of FIG. 31; and

Figure 33:
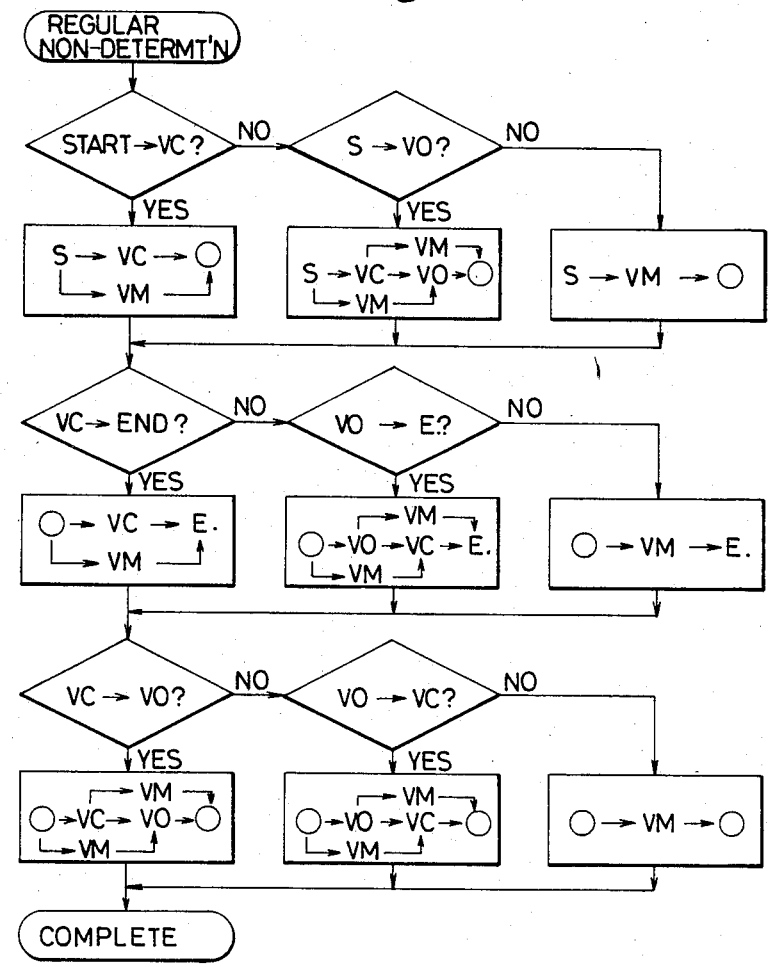

FIG. 33 is a flow chart showing further in detail a part of the reference pattern preparatory step shown in FIG. 30.

While the present invention shall now be detailed hereinafter with reference to the preferred embodiments shown in the drawings, it should be understood that the intention is not to limit the invention only to these embodiments, but rather to include all modifications, alterations and equivalent arrangements possible within the scope of appended claims.

Figure 1:
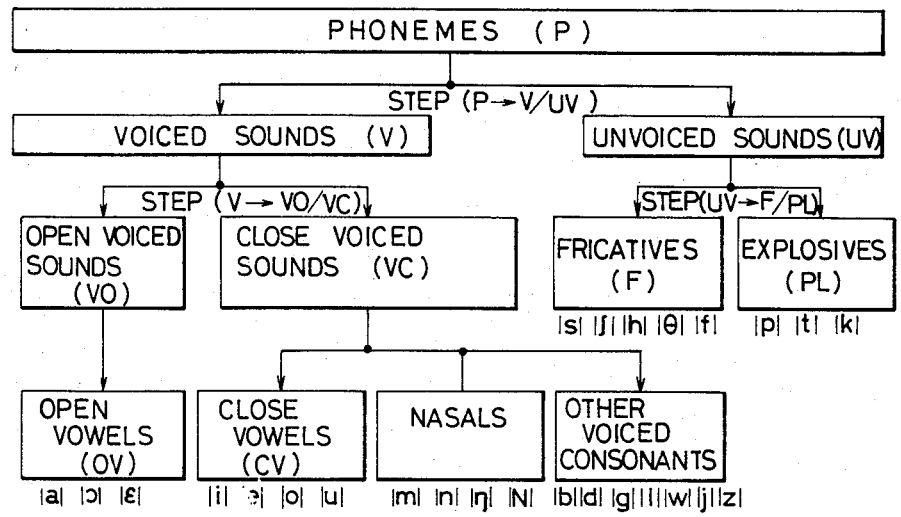
FIG. 1 is a block diagram showing a system of recognizing phoneme elements in a speech message employed in the present invention.

Referring to FIG. 1 of a system of recognizing phoneme elements of a speech message in the present invention, a speech message given orally by an operator is to be recognized by properly selectively adopting the operations of separating phonemes P included in the speech message into voiced sounds V and unvoiced sounds UV (STEP (P→V/UV)), separating the unvoiced sounds UV into fricatives F and explosives PL (STEP (UV→F/PL)), and separating the voiced sounds V into open voices VO, that is, voices high in the energy of the first formant and closed voices VC, that is, voices low in the first formant energy (STEP (V→VO/VC)).

Figure 2:
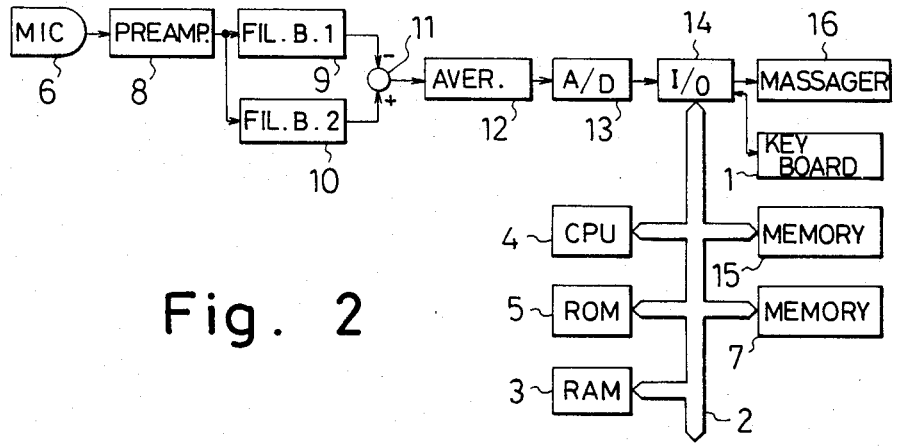
FIG. 2 is a practical embodiment shown in a block diagram of a recognition apparatus of the present invention.
Figure 3:
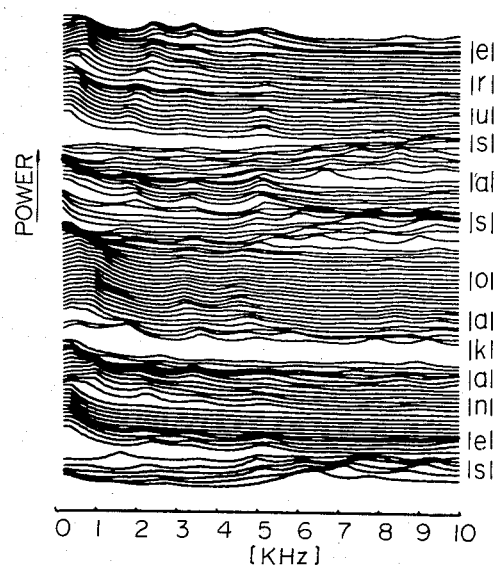
FIG. 3 is a frequency spectra showing an example of speech messages capable of being treated in the present invention, the message, being /senakaosasure/ of a Japanese sentence.
Figure 4:
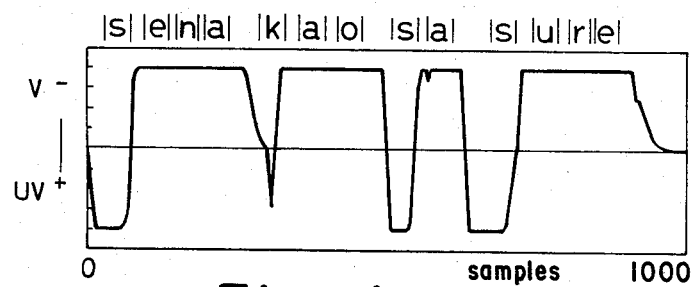
FIG. 4 is a diagram showing voiced and unvoiced sound signals V and UV when the message /senakaosasure/ is received by the embodiment of FIG. 2, the same signals V and UV being generated also in the other embodiments.
Figure 23:
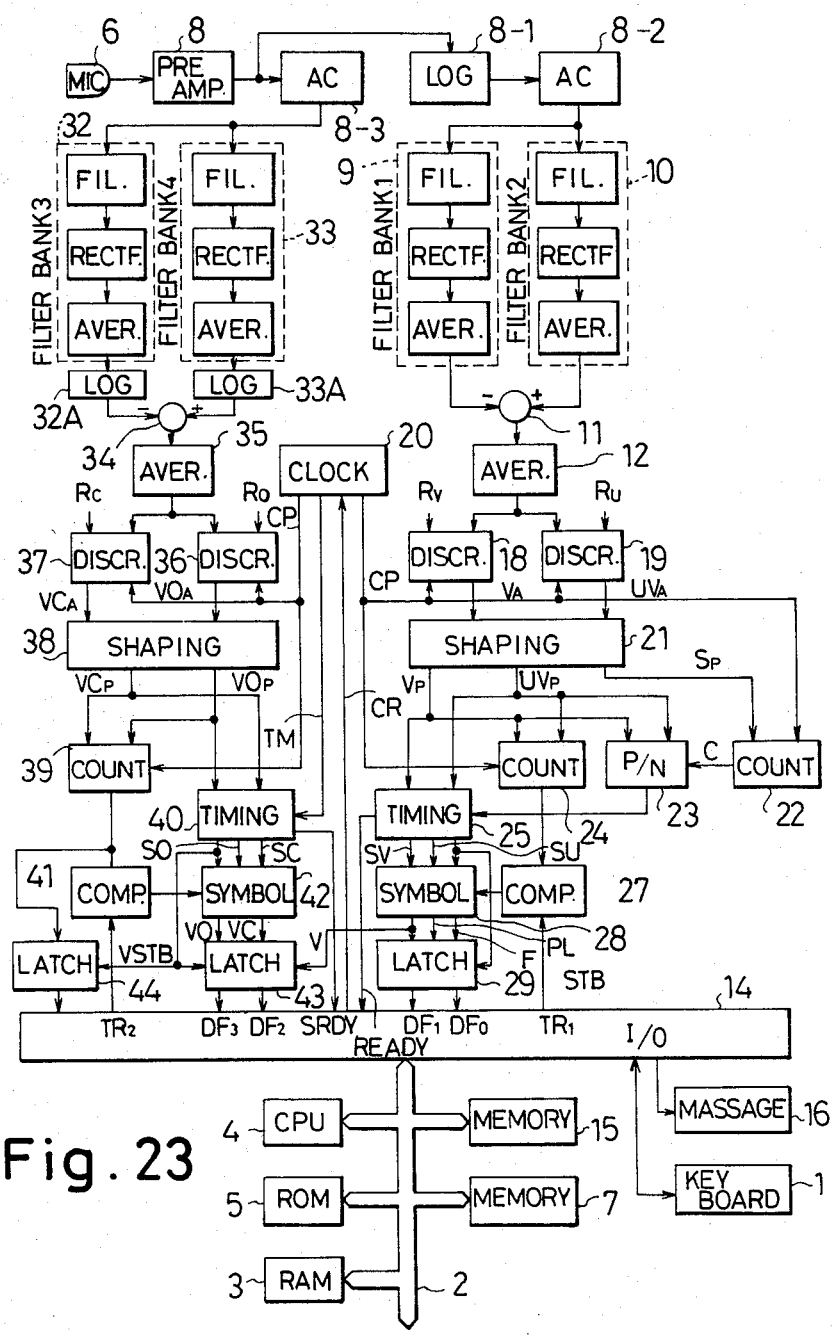
FIG. 23 is a circuit diagram showing a further practical example of the apparatus shown in FIG. 14, for obtaining necessary signals from voiced and unvoiced signals and open and closed voice signals, the operation of which is shown in FIG. 22.

Referring to the first embodiment of the present invention as in FIG. 2 keys of a keyboard 1 are struck and a start command for writing reference patterns is initially stored in an operation memory system RAM 3 through a bus line 2. When a program being executed in a computer CPU 4 reaches the reference pattern writing, the start command is read out of RAM 3 and, in response to this command, a reference pattern writing program is read out of a program memory system ROM 5 and, in response to this program, CPU 4 causes the reference patterns which are provided through the keyboard 1, microphone MIC 6 or any other proper means to be stored in a memory system 7. In the present instance, references shall be made to the reference pattern given through the microphone MIC 6. Now, when the reference pattern of, for example, "Senakaosasure!" (corresponding in English to "Massage the back!") having such spectra as shown in FIG. 3 is given to MIC 6, it will be separated by first and second filter banks 9 and 10 through a preamplifier 8. The first filter bank 9 passes a frequency band of 0 to 1 KHz and the second filter bank 10 passes a frequency band of 5 to 10 KHz. Outputs of the first filter bank 9 are subtracted by a subtracter 11 from outputs of the second filter bank 10 and are averaged at an averaging circuit 12, results of which are such voiced and unvoiced sound signals as shown in FIG. 4. (Speaking strictly, the diagram of FIG. 4 is of the pattern as treated by the first and second filter banks 9 and 10 after being amplified initially by the preamplifier 8 and then by a LOG amplifier 8-1 and AC amplifier 8-2 as shown in FIG. 23 later detailed.) In FIG. 3, the frequency is plotted on the abscissa (KHz) and the energy is plotted on the ordinate, each sample line indicates a phoneme spectrum at every 10 m.sec. and, further, the respective phonemes of the message "Senakaosasure" are noted. In FIG. 4, the voiced and unvoiced sound signals V and UV obtained in correspondence to the spectra in FIG. 3, with values corresponding to the sample lines of FIG. 3 plotted on the abscissa, wave forms being so formed as to correspond to respective states where the sample lines show voiced sounds (that is, of levels exceeding a predetermined first level on the plus (+) side) or unvoiced sounds (that is, of levels less than a predetermined second level on the minus (−) side). The voiced and unvoiced sound signals V and UV are given to an A/D converter 13 through an averaging circuit 12 to be digitalized and then written in the memory system 7 through an I/O port 14. Thus, the writing operation of the reference patterns is completed but, by the same operation, another plurality of reference patterns can be also written into the memory system 7.

Comparisons of the speech message with the reference patterns, that is, the recognition of the speech message shall be explained next. When CPU 4 is in a speech message recognizing step in accordance with the control program stored in ROM 5 (this may be made by striking the keys of the keyboard 1) and such speech message as, for example, the foregoing "Senakaosasure" is given to the microphone MIC 6, the message is given to the first and second filter banks 9 and 10 through the preamplifier 8. Then, in the same manner as the writing of the reference patterns, the speech message is digitalized by the A/D converter 13 and stored in a speech message memory system 15 through the I/O port 14. Thereafter, CPU 4 sequentially compares the speech message in the system 15 with the reference patterns in the memory system 7 in respect of, for example, each sample line in response to the recognizing program in ROM 5.

After completion of the speech message recognizing operation, CPU 4 provides a driving signal to such following device as, for example, a massager 16 through the I/O port 14 in response to results of the recognition.

In the first embodiment shown in FIG. 2, the speech message is utilized as converted into the voiced and unvoiced sound signals V and UV only. In this case, there is remained such a tendency that, in the event of entirely different command but having the same arrangements of the voiced and unvoiced sounds, a misoperation is likely to occur and, in addition, it is uneasy to increase the number of the speech messages which can be recognized. Thus the present invention further suggests an improved modification of the foregoing first embodiment of FIG. 2 as will be referred to in the followings.

Figure 6:
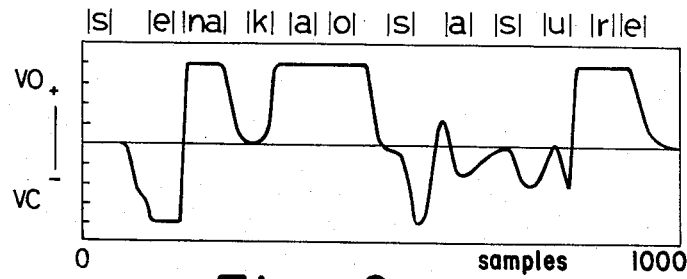
FIG. 6 is a diagram showing open and closed voice signals VO and VC generated when the speech message /senakaosasure/ reaches the embodiment of FIG. 5, the signals V and UV corresponding to which being the same as in FIG. 4.
Figure 5:
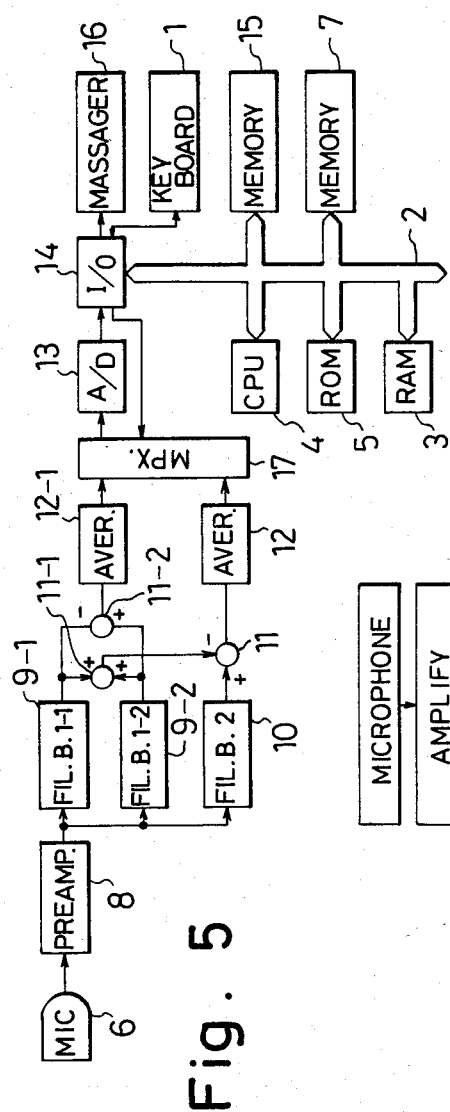
FIG. 5 shows in a block diagram another practical embodiment of the recognizing apparatus of the present invention.

In the second embodiment of the present invention shown in FIG. 5, comparing with the first embodiment, the first filter bank 9 is replaced with a pair of first filter banks 9-1 and 9-2 respective passing band of which is of 0 to 500 Hz and 0.5 to 1 KHz and an adder 11-1 which adds outputs of the respective first filter banks 9-1 and 9-2 to each other, while a subtracter 11-2 for subtracting outputs of the first filter bank 9-1 from the outputs of the other first filter bank 9-2, an averaging circuit 12-1 (including an integrating circuit having a time constant of about 20 m.sec.) for averaging outputs of the subtracter 11-2 and a multiplexer 17 for transmitting respective outputs of the averaging circuit 12-1 and of the foregoing averaging circuit 12 to the A/D converter 13 are additionally provided, and the subtractor 11 subtracts outputs of the adder 11-1 from outputs of the second filter bank 10 and further controls the multiplexer 17 through the I/O port 14, whereby open voice signals VO and closed voice signals VC can be generated at the output end of the averaging circuit 12-1. The signals VO and VC can be illustrated as shown in FIG. 6 in response to the message "Senakaosasure" diagrammatically shown in FIGS. 3 and 4. The same as the voiced and unvoiced sound signals V and UV, the open and closed voice signals VO and VC are averaged in the averaging circuit 12-1 and provided thorugh the multiplexer 17 to the A/D converter 13 to be thereby treated.

In the second embodiment of FIG. 5, the open and closed voice signals VO and VC are utilized in addition to the voiced and unvoiced sound signals V and UV so that, in the operations of writing the reference patterns and comparing the patterns with the speech message with each other, respective treating procedures will become somewhat complicated but, as will be self-evident, such a larger number of comparison informations will result in a higher precision of the message recognition than in the case of the first embodiment. That is, while in the first embodiment only the separating operation STEP (P→V/UV) is to be made with the voiced and unvoiced sound signals V and UV, as seen in FIG. 1, the separating operation in the second embodiment can be carried out for both of the STEP (P→V/UV) and STEP (V→VO/VC) respectively with the voiced and unvoiced sound signals V and UV and open and closed voice signals VO and VC. It will be thus clear that, in the first embodiment, arranged order of the voiced and unvoiced sounds is a recognizing element whereas, in the second embodiment, those of the voiced and unvoiced sounds and of the open and closed voices are the recognizing elements.

Figure 7:
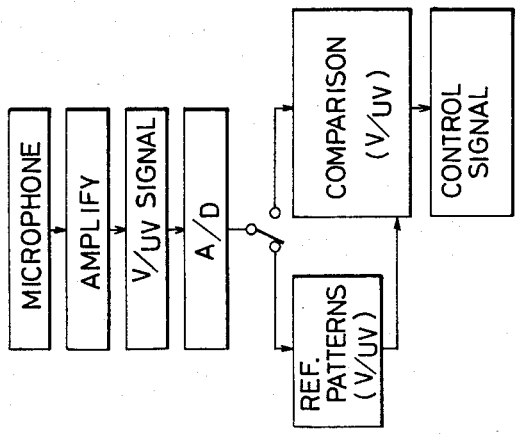
FIG. 7 shows in a flow chart a recognition method according to the present invention, which corresponds to the apparatus of FIG. 2.
Figure 8:
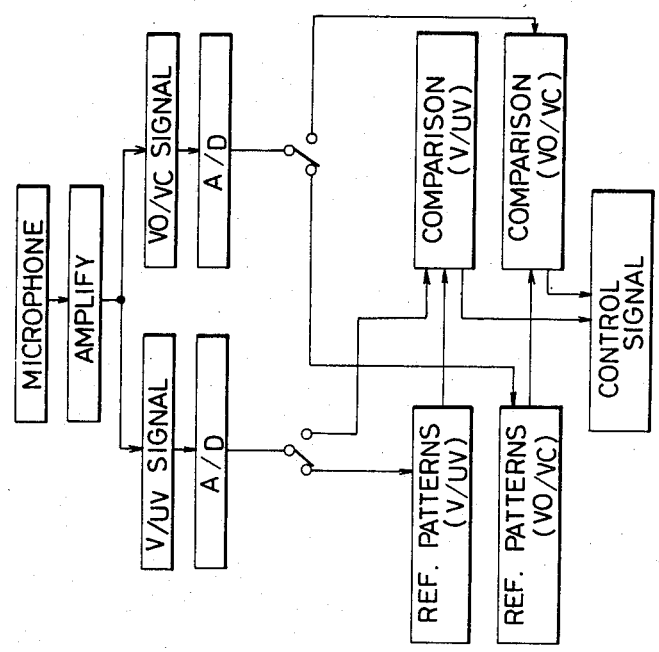
FIG. 8 is a flow chart of another example of the method according to the present invention and corresponding to FIG. 5.

Here, the operations of the above described first and second embodiments shall be referred to more in detail with references to flow charts shown in FIGS. 7 and 8.

FIG. 7 corresponds to the operation of the first embodiment. In writing the reference patterns, standard speech messages obtained through the microphone are amplified and converted into the voiced and unvoiced sound signals V and UV, these signals are digitalized by the A/D converter and stored in the memory system as the reference patterns through the left side course. In recognizing the speech message given by the operator, the circuit is switched over to the right side course, the given speech message received by the microphone is amplified and converted into the voiced and unvoiced sound signals V and UV, which are digitalized by the A/D converter and then provided through the right side course to a recognizing means, that is, means for comparing them with the reference patterns of the standard speech messages stored in the memory system.

In the recognizing means, the reference patterns read out of the memory system and the signals V and UV of the given message are compared with each other usually in step-by-step manner and, when one of the reference patterns and the given message's signals V and UV coincide with each other, a control signal for the following massager or the like is generated responsive to the particular coinciding pattern.

Next, FIG. 8 corresponds to the operation of the second embodiment. In writing the reference patterns, standard speech messages obtained through the microphone are amplified and then converted into the voiced and unvoiced sound signals V and UV as well as into the open and closed voice signals VO and VC, the both signals V, UV and VO, VC are respectively digitalized by the A/D converter and then stored in each of a pair of the memory systems through the left side course. In recognizing the given speech message, the circuit is switched over to the right side course, the given message received by the microphone is amplified and converted also into the voiced and unvoiced sound signals V and UV and open and closed voice signals VO and VC, the both signals V, UV and VO, VC are respectively digitalized by the A/D converter and provided to each of a pair of recognizing means, that is, means for comparing the respective signals V, UV and VO, VC with the reference patterns stored in the respective memory systems. In the recognizing means, the reference patterns read out of the memory systems and the given message's signals V, UV and VO, VC are compared with each other usually in the step-by-step manner and, when one of the reference patterns and the signals V, UV and VO, VC of the given message coincide with each other, a control signal for the following massager or the like is generated responsive to the coinciding pattern.

In the foregoing first or second embodiment, the message recognition is performed by subjecting the voiced and unvoiced sound signals V, UV or these signals V, UV and open and closed voice signals VO, VC to the A/D conversion and comparing the respective signals with the reference patterns in respect of their wave form. In the further embodiments referred to in the followings, improvements are achieved in respect of the recognizing operation.

Figure 9:
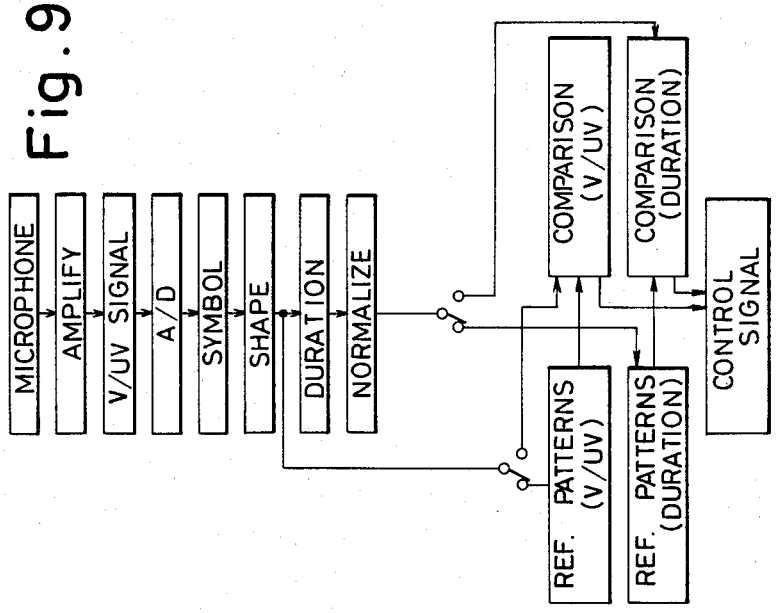

According to a third embodiment, as shown in FIG. 9, voiced, unvoiced and silent sound symbols V, UV and S are made out of the voiced and unvoiced sound signals V and UV digitalized by the A/D converter 13 in the first or second embodiment, rendering the symbol V correspond to the digitalized signals exceeding a predetermined level, the symbol UV to the signals less than another predetermined level and the symbol S to the signals between these two levels. It will be evident, therefore, that the recognizing operation can be made simpler than in the case of the first or second embodiment. In the third embodiment, further, the symbols obtained thus at the symbolizing step are shaped at a shaping step as seen in FIG. 9, so that any ones of the symbols V and UV which are of a duration shorter than a predetermined value will be made the symbol S. When the symbols V exist sequentially with the symbol S of the shorter duration interposed next to the symbol V of a longer duration, the particular symbol S is erased to representation them in the symbol V. When the symbols UV exist sequentially also with the shorter duration symbol S interposed next to the longer duration symbol UV, the symbol S is erased to represent them in the symbol UV. After the shaping step, the respective durations of the shaped symbols V, UV and S are counted and, thereafter, the total duration time from the initiation to the termination of the speech message is obtained. Such total duration time is made to be 1,000 and respective ratios of the shaped symbols V, UV and S are calculated. With this normalizing step for the durations, any phonetic difference and the like between individual speakers of the message can be effectively eliminated so as to improve the recognition efficiency. The respective shaped symbols and corresponding normalized durations are stored in the memory system so as to prepare the reference patterns. After completion of the reference pattern preparation or learning, a given speech message by an operator received by the microphone is similarly processed and the comparison of the reference patterns with the shaped symbols and corresponding normalized durations is performed.

In the third embodiment, as will be made clear by reference to FIG. 9, the duration normalizing step may be omitted if desired, since the recognition ability will be well maintained even with such omission specifically when the number of elements in the speech message is limited to be smaller. Further in the third embodiment, the duration measuring step may even be omitted, in which event the recognition is to be performed only with the shaped symbols so that the arrangement can be remarkably advantageously simplified.

Processings of the signals or symbols after the A/D conversion in the third embodiment are performed at CPU 4 and references to FIG. 2 will sufficiently clarify a practical example of circuit arrangement of this embodiment.

Figure 10:
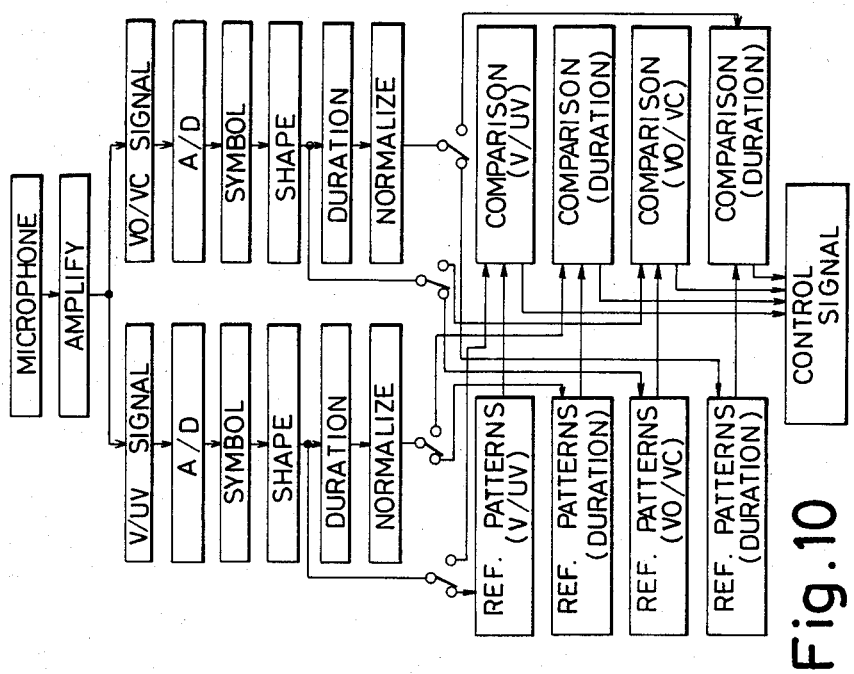
FIGS. 9 to 12 are flow charts showing respective other examples of the method according to the present invention, wherein FIGS. 9 and 11 correspond to FIG. 2 and FIGS. 10 and 12 to FIG. 5.

Referring next to a fourth embodiment of the method shown in FIG. 10, as in the second embodiment of FIG. 5, the voiced, unvoiced and silent sound symbols V, UV and S are made, in the same manner as in the third embodiment, out of the voiced and unvoiced sound signals V and UV digitalized in the A/D converter 13, and the open, closed and medium voice symbols VO, VC and VM are made, at every presence of the voiced sound symbol V, out of the digitalized open and closed voice signals VO and VC. That is, "i" groups of the symbols VO, VC and VM is produced for every "i"th voiced sound symbol V(i). In producing the symbols VO, VC and VM, they are respectively made to correspond to the period in which the digitalized signals VO and VC exceed a predetermined level, the period in which they are less than another predetermined level and the period in which they are between the both levels. The respective symbols are then shaped at the shaping step in the same manner as in the third embodiment for the symbols V, UV and S whereas, for the symbols VO, VC and VM, the both symbols VO and VC of a duration shorter than a predetermined value are made to be symbol VM and any symbol VM shorter than the predetermined value and present as interposed between respective sequential symbols VO specifically next to the symbol VO of a longer duration than the predetermined value is erased and made to be the symbol VO. Further, any symbol VM of a shorter duration present as interposed between the respective sequential symbols VC specifically next to the longer duration symbol VC is erased and made to be the symbol VM. After the shaping, the durations of the respective shaped symbols V, UV, S, VO, VC and VM are counted and, thereafter, the same normalization as in the third embodiment is carried out. While the duration normalizing operation for the symbols V, UV and S will be clear in the foregoing, the durations of the symbols VO, VC and VM are performed with respect to each of the symbols V(i). Thus, the total duration time of the respective symbols VO, VC and VM for every symbol V(i) is set to be 1,000 and the ratio thereto of the respective durations of the symbols VO, VC and VM is obtained. The respective shaped symbols and their corresponding normalized durations are stored in the memory systems so as to prepare therein the reference patterns. After completion of the preparation or learning of the reference patterns, the speech message given to the microphone by the operator is processed in the same manner as in the foregoings, and their shaped symbols and corresponding normalized durations are compared with the stored reference patterns. Referring in detail to this comparison, at the first hierarchy, a comparison in respect of the respective symbols V, UV and S is performed to extract a group of the reference patterns having any pertinency to the message, and a comparison in respect of the normalized durations of the symbols V, UV and S is also performed to further select pertinent ones out of the extracted group of the reference patterns. At the second hierarchy, a comparison is performed in respect of the symbols VO, VC and VM for the selected reference patterns and, at the same time, a comparison in respect of the normalized durations of these symbols VO, VC and VM, so as to extract the most pertinent and next pertinent ones of the reference patterns. When these two pertinent patterns do not show any significant difference between them, it is indicated that a re-entry of the speech message is necessary but, if a significant difference is shown, then a command responsive to the most pertinent reference pattern is provided to such device to be controlled as the massager.

In the above fourth embodiment, as will be evident in view of FIG. 10, the normalizing step and, further, even the measuring step for the durations may be omitted if so desired.

While in the third and fourth embodiments the respective signals are symbolized after the A/D conversion, modifications made in this respect of the first and second embodiments shall be described in the followings as fifth and sixth embodiments of the invention.

Figure 11:
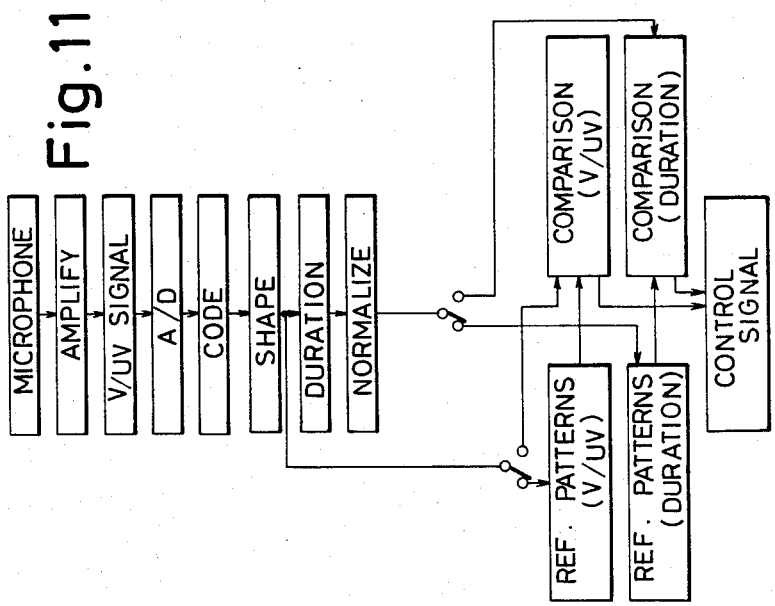

In the fifth embodiment, as seen in FIG. 11, the symbolizing step for the signals V and UV after the A/D conversion in the third embodiment of FIG. 9 is replaced by a coding step, which is performed so that "+1" corresponds to exceeding portions of the digitalized signals V and UV above a predetermined level, that is, voiced sound portions, "−1" corresponds to portions below another predetermined level, that is, unvoiced sound portions and "0" corresponds to portions between the two levels, that is, silent sound portions. At the shaping step after the coding, the coded signals corresponding to "+1" and "−1" but having a shorter duration than the predetermined value are made to be "0", any signals of "0" of a shorter duration interposed between respective sequential "+1" signals but next to "+1" of a longer duration are erased and made to be "+1", and any ones of "0" of a shorter duration interposed between respective sequential "−1" signals but next to "−1" of a longer duration are erased and made to be "−1". Subsequent steps are the same as those in the third embodiment.

Figure 12:
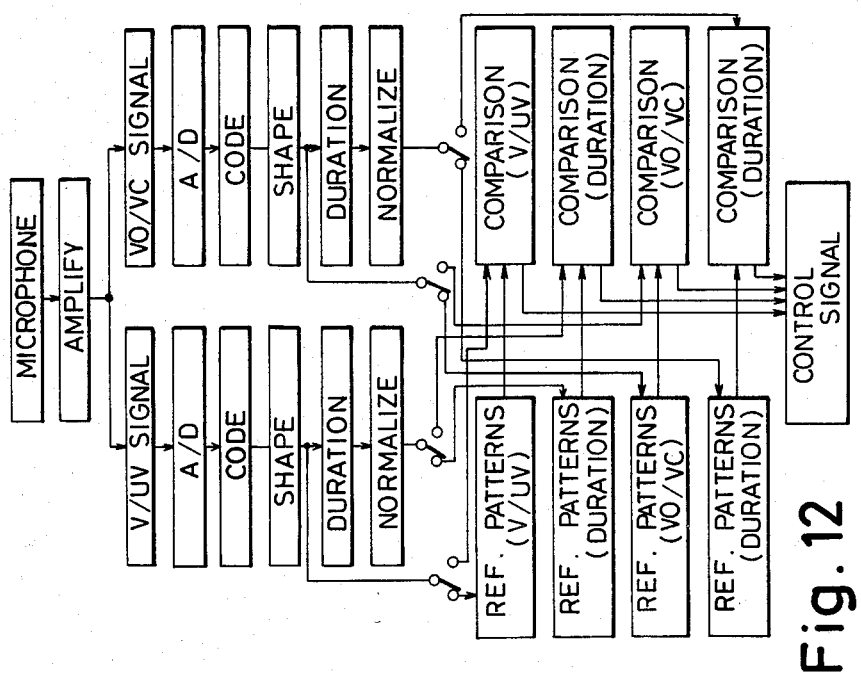

Referring to the sixth embodiment, as seen in FIG. 12, the symbolizing step for the voiced and unvoiced signals V and UV as well as the open and closed voice signals VO and VC after the A/D conversion is made to be a coding step, at which the digitalized signals V and UV are coded in the same manner as in the fifth embodiment whereas the digitalized signals VO and VC are coded so that "+1" corresponds to signal portions exceeding a predetermined level, that is, open voice portions, "−1" corresponds to portions below another predetermined level, that is, closed voice portions, and "O" corresponds to portions between these two levels, that is, medium voice portions. The shaping step after the coding is the same as that referred to with reference to the fourth embodiment.

While in the foregoing first through sixth embodiments the A/D conversion, subsequent symbolization and three-value coding are performed, it is optimumly possible to render the A/D conversion to be unnecessary in some case. For instance, in the case where the recognition ability may be allowed to be lower than that of the A/D conversion, a pulse encoder may be employed as will be referred to in the followings.

Figure 15:
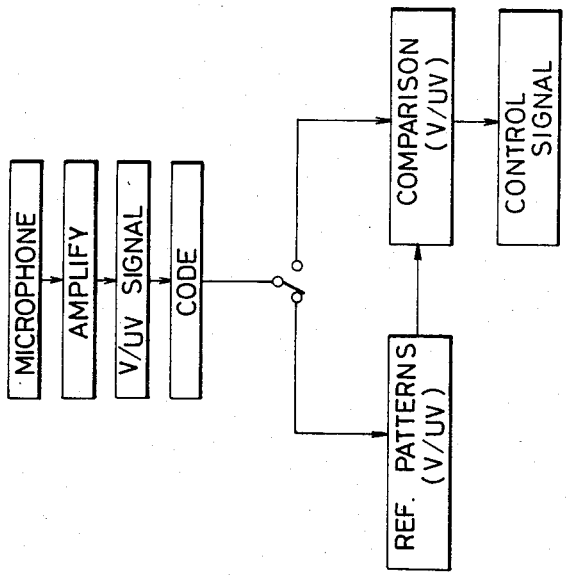
FIGS. 15 to 18 are flow charts showing respective examples of the method according to the present invention, wherein FIGS. 15 and 17 correspond to the apparatus of FIG. 13 and FIGS. 16 and 18 to FIG. 14.
Figures 13, 14:
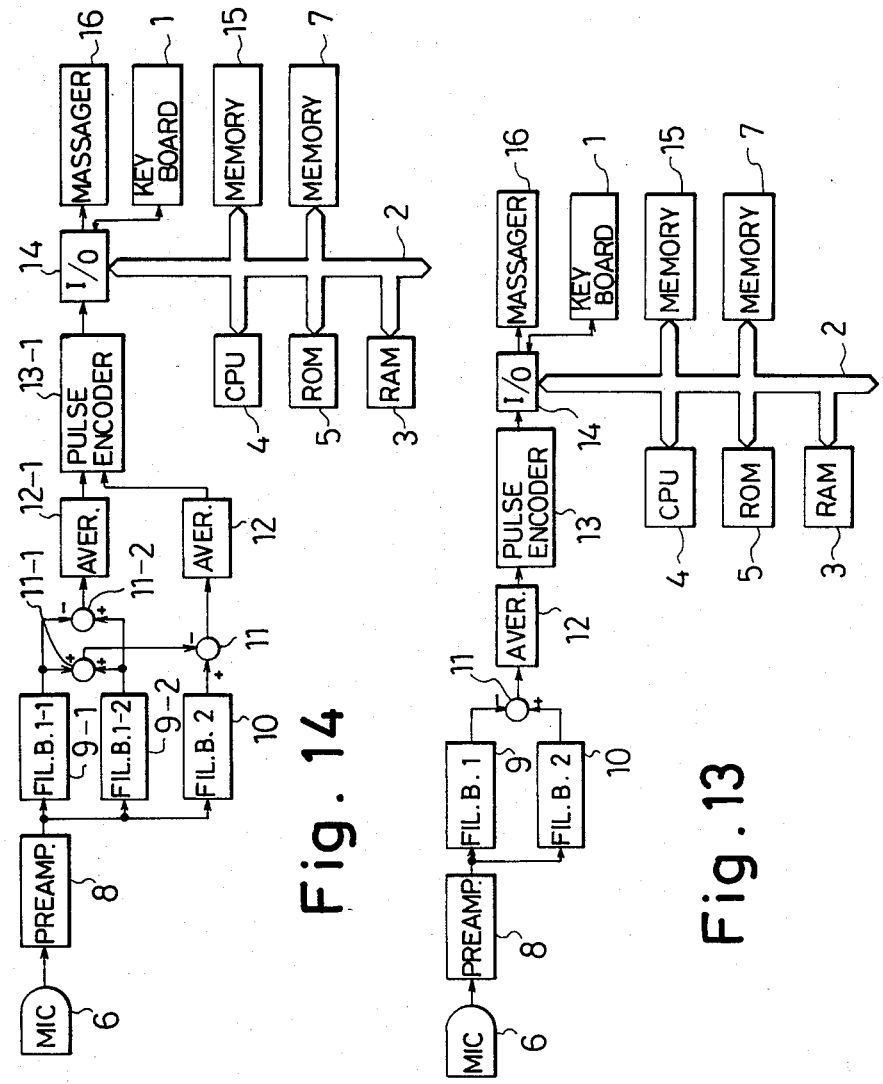
FIGS. 13 and 14 show in block diagram other embodiments of the recognizing apparatuses according to the present invention.

Referring now to a seventh embodiment of the present invention by references to FIG. 13, the A/D converter 13 in the first embodiment of FIG. 7 is replaced by a pulse encoder 13-1 so as to lower required costs for the case where any higher recognition ability is not called for, as will be readily understood. Thus, in the present instance, the signals are coded so that "+1" will correspond to portions of the signals V and UV exceeding a predetermined level, that is, voiced sound portions, "−1" to those silent sound portions which are below another predetermined level and "O" to silent sound portions between these two levels. This coding may be shown in such flow chart as that of FIG. 15, as will be evident from the above explanation.

Figure 16:
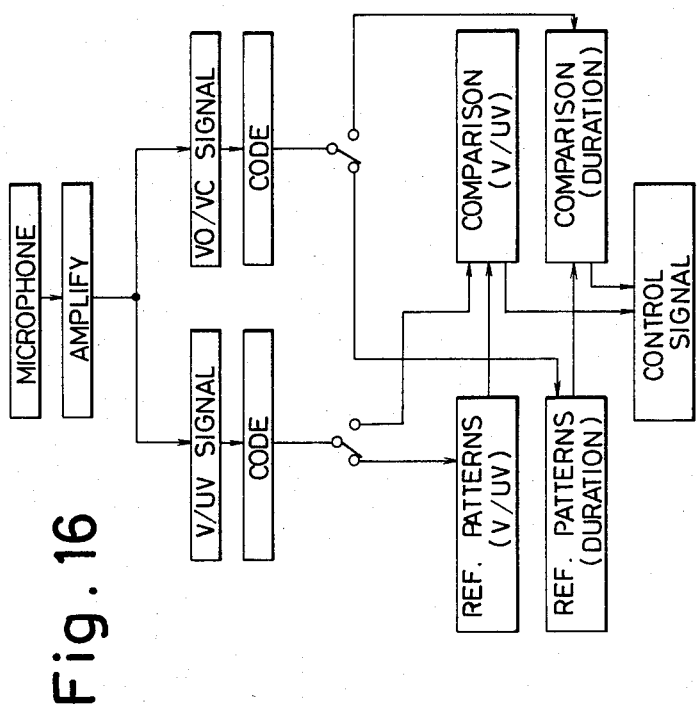

FIG. 14 is of an eighth embodiment of the present invention, wherein the multiplexer 17 and A/D converter 13 of the second embodiment of FIG. 5 are omitted and a pulse encoder 13-1 is inserted between the averaging circuits 12 and 12-1 and the I/O port 14. It will be clear that the eighth embodiment of this arrangement shows the same effects as the seventh embodiment. Thus, the coding is performed in such that "+1" corresponds to the voiced sound portions of the voiced and unvoiced sound signals V and UV exceeding a predetermined level, "−1" to the unvoiced sound portions below another predetermined level, and "0" to the silent sound portions between the two levels. When the voiced sounds exist, further, the coding is also made so that "+1" corresponds to the open voice portions of the open and closed voice signals VO and VC exceeding a predetermined level, "−1" to the closed voice portions below another predetermined level, and "O" to the medium voice portions between the two levels. This may be shown in such flow chart as shown in FIG. 16.

Figure 17:
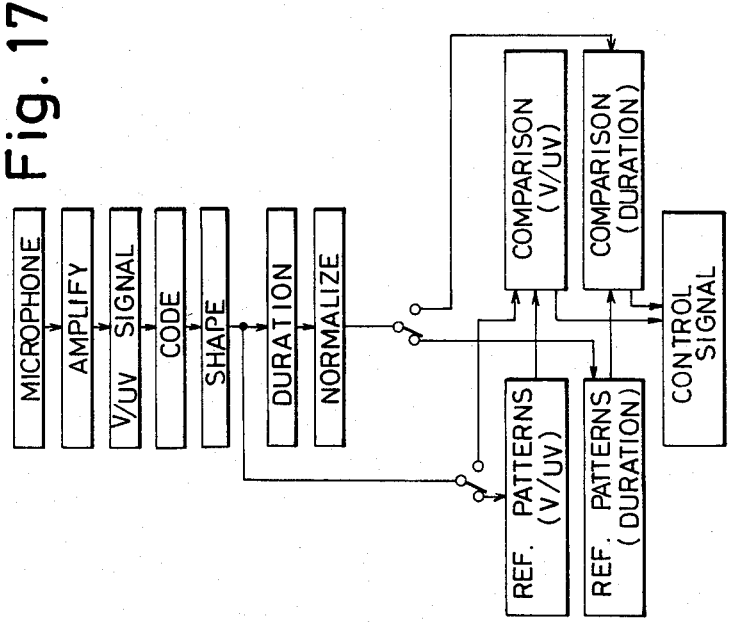

A nineth embodiment of the present invention is related to the seventh embodiment. In addition to the coding by means of the pulse encoder 13-1 in the seventh embodiment, the number of sampling pulses are simultaneously counted so that the durations of the respective voiced, unvoiced and silent sound periods are also measured and normalized. This normalization of the measured duration value represents the respective durations at ratios of the respective voiced, unvoiced and silent sound periods with respect to the total duration time from the initiation to the termination of the speech message, said total time being made to be, for instance, 1,000. With this representation, any influence on the recognition due to varying incoming velocities of the message signals caused by possible phonetic difference between individual message speakers or the like can be removed and the recognition accuracy can be further improved. Since recognition indexes are expanded in the present instance from the voiced, unvoiced and silent sound representation to their duration representation, the recognition efficiency can be further improved. It will be further evident that, as the recognizing operation can be performed after an evaluation as to validity and invalidity of the voiced, unvoiced and silent sound representation by means of the length of durations, effective shortening of time required for the operation can be also achieved, and that, in view of the above descriptions, the particular operation can be shown in such a flow chart as that of FIG. 17.

A tenth embodiment of the present invention is dependent on the eighth embodiment. In addition to the coding by means of the pulse encoder 13-1 in the case of the fourth embodiment, the number of the sampling pulses is simultaneously counted, whereby the durations of the respective voiced, unvoiced and silent sound periods and of the respective open, closed and silent voice periods or of the respective open, closed, medium and silent voice periods are also measured. The measured duration values are normalized substantially in the same manner as in the case of the nineth embodiment. It will be apparent, in view of the references to the nineth embodiment, that this tenth embodiment can achieve the same effect as the nineth embodiment. The operation in the present instance is shown in the flow chart of FIG. 18.

In all of the foregoing first to tenth embodiments of the present invention, the desired voiced and unvoiced sound signals V and UV and open and closed voice signals VO and VC are obtained by the subtractions between the outputs of the filter banks so that an effective noise elimination can be achieved. However, if a series circuit of an LOG amplifier and AC amplifier is further inserted following the preamplifier 8, the noise can be well eliminated. In practice, there will be no trouble when the LOG amplifier is inserted between the preamplifier 8 and the differential amplifier 11 (or the differential amplifiers 11 and 34 in FIG. 23 referred to later). Further explanation shall be limited to those of such embodiments as shown in, for example, FIGS. 19 and 23, since details of the arrangement will be readily understood in view of FIGS. 2, 5, 13 and 14.

The present invention shall be further explained with reference to other preferred embodiments.

Figure 19:
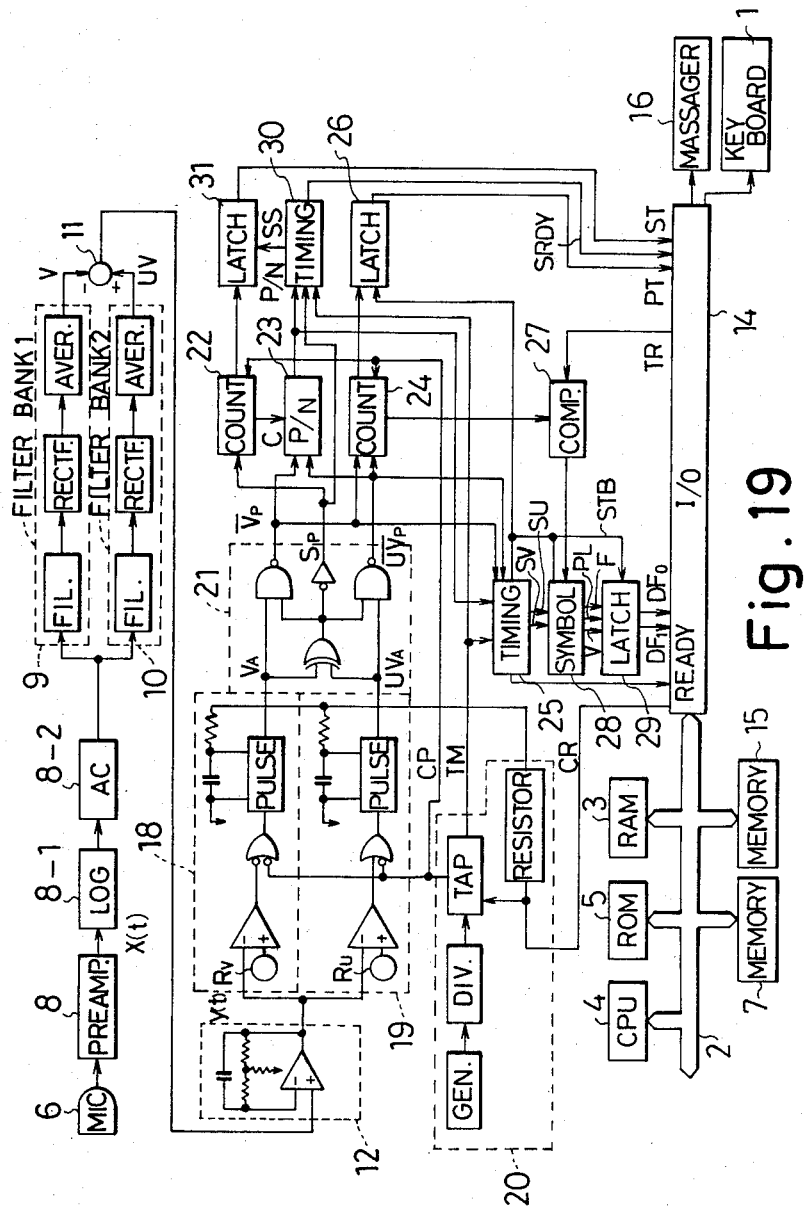
FIG. 19 is a circuit diagram showing a further practical example of the apparatus of FIG. 13, for obtaining necessary signals from voiced and unvoiced sound signals.

FIG. 19 shows a circuit of a further practical arrangement of the embodiment shown in FIG. 13, wherein a speech message X(t) received by the microphone 6 is made to be signals LOGX(t) through the preamplifier 8, LOG amplifier 8-1 and A.C. amplifier 8-2, and the signals are transmitted to the input ends of the first filter bank 9 and second filter bank 10. As examples of the speech message X(t), /a/ and /u/ are shown respectively in FIGS. 20A and 20B. In FIG. 20A, a LOGX(t) signal for /a/ in a LOG-converted wave form is also shown, and in FIG. 20B a similar signal for /u/ is also shown. The first filter bank 9 comprises a series circuit of a filter passing a frequency component of less than 1 KHz, rectifying circuit and averaging circuit which comprises an integrating circuit (of a time constant of about 10 m.sec.), while the second filter bank 10 comprises a series circuit of a filter passing a frequency component of 5 to 12 KHz, rectifying circuit and averaging circuit which comprises an integrating circuit (of a time constant of about 1 m.sec.). FIG. 21A shows frequency spectra of /s/ (unvoiced sound) and /a/

(voiced sound) as examples of the speech message X, while frequency spectra of their LOG-converted LOGX signals are shown in FIG. 21B. In comparing these FIGS. 21A and 21B with each other, it will be evident that, in the present invention, subsequent treatments can be simplified by the LOG-conversion while maintaining the recognizing degree. Outputs of the first filter bank 9 are subtracted from outputs of the second filter bank 10 in the differential amplifier 11, outputs of the latter of which are averaged by the averaging circuit 12 which comprises an integrating circuit (of a time constant of 10 m.sec.) and are provided to discriminating circuits 18 and 19 as averaged voiced and unvoiced signals y(t). The discriminating circuit 18 provides, upon receiving each clock pulse generated in a clock pulse generating circuit 20, that is, a sampling pulse $C_p$ (a cycle of 8 m.sec.) but only when the voiced and unvoiced sound signals are smaller than a reference value $R_v$, a high level output. The cycle of $C_p$ is properly set by a CR constant defined by the I/O port 14, that is, the output of the clock pulse generating circuit is frequency divided by a frequency divider and is then subjected to a proper cycle setting at a TAP circuit in response to CR from the I/O port 14. The discriminating circuit 19 provides a high level output upon each sampling pulse $C_p$ from the circuit 20 but only when the voiced and unvoiced sound signals V and UV are larger than the reference value $R_v$. In response to the sampling pulse $C_p$ provided by the clock generating circuit 20, a retriggerable one-shot pulse generating circuit in the respective discriminating circuit 18 and 19 (width of one-shot pulse being 1.5 times as large as the sampling cycle and adjusted by a resistance change-over circuit of the circuit 20 responsive to CR) actuates to provide signals $V_A$ and $UV_A$. FIG. 22 explains the operation in the case when the signals $V_A$ and $UV_A$ are made out of the voiced and unvoiced signals y(t) corresponding to a speech message /seQto/ by using the sampling pulse $C_P$. In a shaping circuit 21, a reversed signal of a signal $S_P$ representing a silent sound is made out of the signals $V_A$ and $UV_A$ in an exclusive logic sum circuit and, utilizing this reversed signal, signals $V_P$ and $UV_P$ showing respectively a voiced sound and an unvoiced sound are produced in a NAND circuit. The signal $S_P$ is provided to the counter 22 and clears a counter 22 at the time point of rising to a high level. After being cleared and while the signal $S_P$ is on the high level, the counter 22 counts the number of the sampling pulses $C_P$ to measure the length of the unvoiced sound period. Only when the counted value of the counter 22 becomes larger than a predetermined number, a signal C is provided.

A discriminating circuit 23 discriminates whether the speech message X(t) is being received or not and provides a high level output P/N in response to the rise of the signals $V_P$ and $UV_P$ to a high level, and this output P/N falls in response to the output C of the counter 22. That is, the output P/N is a pulse which rises at the starting point of the speech message X(t) and falls at the terminating point. Further, a counter 24 is cleared when pulses of the signals $V_P$ and $UV_P$ rise and counts the sampling pulses CP in the same manner as the counter 22 does while the pulse of $V_P$ and $UV_P$ are on the high level. On the other hand, a timing circuit 25 generates a strobe signal STB upon falling of the signals $V_P$, $UV_P$, P/N and a pulse TM provided from the clock generating circuit 20. The pulse TM is generated by a TAP change-over circuit of the pulse generating circuit 20 in response to CR, with a certain time lag with respect to the sampling pulse $C_P$ by the operating time of the counter 22 and discriminating circuit 23. In response to the strobe signal STB, a latch circuit 26 records counting contents of the counter 24 which are compared in a comparing circuit 27 with a signal TR being given through the I/O port 14. The signal TR is set by an operating panel, that is, the keyboard 1 in response to the speaking speed of the operator, that is, the incoming velocity of the speech message. The signal TR is a reference value for determining whether the phoneme component in the signal $UV_P$ is an unvoiced fricative F or an unvoiced explosive PL and is utilized to generate a signal for recognizing it to be the unvoiced fricative F in case the duration, that is, the counted value of the counter 24 exceeds the value TR and to be the unvoiced explosive PL in case the duration or counted value of the counter 24 is below TR. The result of the comparison by the comparing circuit 27 is provided to a symbolizing circuit 28 which provides a signal for distinguishing the voiced sound V, unvoiced fricative F and unvoiced explosive PL from each other in response to the strobe signal STB and signals SV and SU given from the timing circuit 25 in response to the signals $V_P$ and $UV_P$. When $V_P$ is on a high level, the SV pulse is given from the timing circuit 25 upon arrival of the pulse TM and the symbolizing circuit 28 provides a pulse representing the voiced sound V in response to the strobe signal STB. When $UV_P$ is on a high level, the SV pulse is given from the timing circuit 25 upon arrival of the pulse TM and the symbolizing circuit 28 provides a pulse representing the unvoiced fricative F or unvoiced explosive PL in response to results of the comparison of the comparing circuit 27 and the strobe signal STB. Therefore, the output signals V, PL and F of the circuit 28 will be respectively "1", "0" and "0" in the case of the voiced sound V, "0", "0" and "1" in the case of the unvoiced fricative F, and "0", "1" and "0" in the case of the unvoiced explosive PL. In the case of the silent sound, on the other hand, the signals V, PL and F will be respectively "0", "0" and "0". The output signals V, PL and F of the discriminating circuit 28 are provided to a latch encoder 29 by the strobe signal STB, converted respectively from (0, 0, 0) into (0, 0), (1, 0, 0) into (0, 1), (0, 0, 1) into (1, 0) and (0, 1, 0) into (1, 1) so as to be binary signals DF and thereafter provided into the I/O port 14. After the binary signals DF (indicated in FIG. 19 as $DF_1$ and $DF_0$ including the positionings) is provided out of the latch encoder 29 by the strobe signal, a READY signal is provided from the timing circuit 25 to the I/O port 14 in response to the respective signal pulses P/N, $S_p$, $V_p$, $UV_p$ and TM, and contents in the latch circuit 26 are provided thereout as a pulse PT.

The other timing circuit 30 is receiving the signals $S_p$, P/N and TM to generate signals SS and SRDY. Responsive to the signal SS, the latch circuit 31 stores the contents of the counter 22, while the signal SRDY is a ready signal representing completion of contents sent out of the latch circuit 31 (represented by a signal ST).

CPU 4 stores the respective signals DF (contents being $DF_1$ and $DF_0$), PT and ST in the reference pattern emory system 7 or speech message memory system 15 in response to RAM 3 and ROM 5. That is, a classification represented by the signal DF of the silent sound S, voiced sound V, unvoiced fricative F and unvoiced explosive PL, respective durations represented by the signal PT (from the latch circuit 31) of the voiced sound V, unvoiced fricative F and unvoiced explosive PL (provided from the latch circuit 26) and durations of the silent sound S (from the latch circuit 31) are stored. Then, the computer CPU 4 compares the signal DF with that of the reference patterns to recognize it (contents of DF are shown by V, F, PL and S in the pattern 1 of FIG. 22). When the DF recognition coincides with certain ones of the reference patterns, then the durations are compared. In comparing the durations, it will be most preferable to have the durations normalized preliminarily. When the speech message coincides with one of the reference patterns in this recognizing operation, a proper command signal for controlling such instrument as, for example, the massager is provided in response to the given speech message.

While in the embodiment of FIG. 19 the step of preparing the signals DF, PT and ST out of the signals $V_A$ and $UV_A$ is performed in such circuit arrangement as shown, it will be evident that the step may be performed in CPU 4. A flow chart of this embodiment will be evident in view of those shown in FIGS. 15 and 17 and shall be omitted here.

FIG. 23 shows a more practical embodiment of the one shown in FIG. 14, for comparing also the open and closed voice signals VO and VC in addition to the comparison referred to with reference to FIG. 19. The speech message X obtained through the microphone 6 is amplified in the preamplifier 8 and converted to the signals LOGX through the LOG amplifier 8-1 and AC amplifier 8-2, and these signals are transmitted to the input ends of the first and second filter banks 9 and 10. The first filter bank 9 is formed of a series circuit of a filter passing a frequency component below 1 KHz, rectifying circuit and averaging circuit comprising an integrating circuit (a time constant of about 10 m.sec.), and the second filter bank 10 is also formed of a series circuit of a filter passing a frequency component of 5 to 12 KHz, rectifying circuit and averaging circuit comprising an integrating circuit (a time constant of about 1 m.sec.) The output of the first filter bank 9 is subtracted from the output of the second filter bank 10 in the differential amplifier 11, outputs of which are averaged by the averaging circuit 12 comprising an integrating circuit (of a time constant of 10 m.sec.) and fed as the voiced and unvoiced signals V and UV to the discriminating circuits 18 and 19. The discriminating circuit 18 provides a high level output upon each arrival of the clock pulse, that is, the sampling pulse $C_P$ (a cycle of 8 m.sec.) from the clock generating circuit 20 but only when the signals V and UV are smaller than a reference value $R_V$, and the other discriminating circuit 19 also provides a high level output upon each sampling pulse $C_P$ from the clock generating circuit 20 but only when the signals V and UV are larger than the reference value $R_U$. In response to the sampling pulse $C_P$, further, the retriggerable one-shot pulse generating circuits (the one-shot pulse being of a width 1.5 times as large as that of the sampling pulse) in the discriminating circuits 18 and 19 operate and provide signals $V_A$ and $UV_A$. The shaping circuit 21 produces from the signals $V_A$ and $UV_A$ a reversed signal SP representing a silent sound at an exclusive logic sum circuit and also produces, utilizing this reversed signal $S_P$, signals $V_P$ and $UV_P$ respectively representing a voiced sound V and unvoiced sound UV at a NAND circuit. The reversed signal $S_P$ is being provided to the counter 22 and clears the same at the time point when the signal rises to a high level. After being cleared and while the signal $S_P$ is on the high level, the counter 22 counts the number of the sampling pulses $C_P$ to measure the length of the silent sound period and, only when the counted value of the counter 22 is above a predetermined number, the signal C in provided.

The discriminating circuit 23 discriminates whether the speech message X(t) is being received or not and provides a high level output P/N in response to the rise to a high level of the signal $V_P$ and $UV_P$. The output P/N falls in response to the output C of the counter 22, that is, the output P/N is a pulse which rises at the starting point of the speech message X(t) and falls at its terminating point. Further, the counter 24 is cleared when the pulses of $V_P$ and $UV_P$ rise and counts the sampling pulses $C_P$ similarly to the counter 22 during the period in which the pulses of $V_P$ and $UV_P$ are on the high level. On the other hand, the timing circuit 25 generates a strobe signal STB upon fallings of the signals $V_P$, $UV_P$ and P/N. In addition, the timing circuit 25 also generates signals SV and SU in response to $V_P$, $UV_P$ and P/N. Counts of the counter 24 is compared with a signal $TR_1$ given through the I/O port. This signal $TR_1$ is set by the operating panel, that is, the keyboard 1 in response to the speaking speed of the operator or, in other words, the arriving speed of the speech message. Further, the signal $TR_1$ is a reference value for determining whether the phoneme component in the unvoiced sound signal $UV_P$ is an unvoiced fricative F or unvoiced explosive PL and is utilized to generate a signal for recognizing the sound to be an unvoiced fricative F when the duration of the sound or counts of the counter 24 is above the signal $TR_1$, and to be an unvoiced explosive PL when the duration or counts is below $TR_1$. Compared result of the comparing circuit 26 is being given to the discriminating circuit 27 which provides a signal for distinguishing the respective voiced sound V, unvoiced fricative F and unvoiced explosive PL from one another in response to the signals SV and SU being provided from the timing circuit 25 responsive to the signals $V_P$ and $UV_P$, strobe signal STB and compared result of the comparing circuit 26. When the signal $V_P$ is on a high level, a pulse SV is provided from the timing circuit 25 and the discriminating circuit 27 provides a pulse showing that it is a voiced sound V, in response to the strobe signal STB. When $UV_P$ is on a high level, a pulse SV is given from the timing circuit 25, and the discriminating circuit 27 also provides a pulse showing that the signal is of an unvoiced fricative F or unvoiced explosive PL, in response to the comparison result of the comparing circuit 26 and strobe signal STB. Therefore, the output signals V, PL and F of the discriminating circuit 27 will be respectively "1", "0" and "0" in the case of the voiced sound V, "0", "0" and "1" in the case of the unvoiced fricative F, "0", "1" and "0" in the case of the unvoiced explosive PL, and "0", "0" and "0" in the case of the silent sound. The output signals V, F and PL are provided to the latch encoder 28 by the strobe signal STB and are converted from (0, 0, 0) to (0, 0), from (1, 0, 0) to (0, 1), from (0, 0, 1) to (1, 0) and from (0, 1, 0) to (1, 1) so as to be a binary signal DF and thereafter provided to the I/O port 14. After the binary signal DF (indicated in FIG. 23 as $DF_1$ and $DF_0$ including the positionings) is provided out of the latch encoder 28 by the strobe signal, a READY signal is provided to the I/O port from the timing circuit 25 in response to P/N, $V_P$ and $UV_P$.

The speech message X(t) amplified by the preamplifier 8 is transmitted to the input ends of third filter bank 32 and fourth filter bank 33 through a high-range emphasizing amplifier 8-3 of +6 dB/OCT. The third filter bank 32 is formed of a filter passing a frequency component of 0 to 0.5 KHz, rectifying circuit and averaging circuit comprising an integrating circuit (a time constant of about 5.5 m.sec.) and the fourth filter bank 33 is formed of a series circuit of a filter passing a frequency component of 0.5 to 1.0 KHz, rectifying circuit and averaging circuit comprising an integrating circuit (a time constant of about 10 m.sec.). Outputs of the third filter bank 32 are logarithmically amplified by a LOG amplifier 32A and are subtracted from outputs of the fourth filter bank 33 which are logarithmically amplified by another LOG amplifier 33A, at the differential amplifier 34. It will be clear that outputs of this differential amplifier 34 can be simulated by the LOG amplifiers 32A and 33A to those which are audible to human being. The differential amplifier outputs are averaged in an averaging circuit 35 which comprises an integrating circuit (a time constant of 20 m.sec.) and provided to discriminating circuits 36 and 37 as the open and closed voice signals VO and VC. The discriminating circuit 36 provides a high level output whenever the clock pulse, that is, the sampling pulse $C_P$ (a cycle of 8 m.sec.) generated by the clock generating circuit 20 arrives but only when the signals VO and VC are smaller than a reference value $R_o$, and the other discriminating circuit 37 provides also a high level output at every sampling pulse $C_P$ from the circuit 20 but only when the signals VO and VC are smaller than a reference value $R_c$. In response to the sampling pulse $C_P$ provided from the clock generating circuit 20, retriggerable one-shot pulse generating circuits (one-shot pulse being of a width 1.5 times as large as the sampling pulse cycle) in the discriminating circuits 36 and 37 are operated to provide signals $VO_A$ and $VC_A$, from which signals a shaping circuit 38 produces at its exclusive logic sum circuit reversed signals of them representing silent sounds and at a NAND circuit a signal $VO_P$ showing an open voice VO and a signal $VC_P$ showing a closed voice VC, utilizing the reversed signals. These signals $VO_P$ and $VC_P$ are being provided to a counter 39 and clear the same upon their rise. After being cleared, the counter 39 counts the sampling pulses $C_P$ while the respective signals $VO_P$ and $VC_P$ are on a high level. On the other hand, a timing circuit 40 generates a strobe signal VSTB upon fallings of the signals $VO_P$ and $VC_P$. In addition, the timing circuit 40 generates also signals SO and SC in response to $VO_P$, $VC_P$, and TM. Counts of the counter 39 are compared in a comparing circuit 41 with a signal $TR_2$ given through the I/O port. This signal $TR_2$ is set by the operating panel, that is, the keyboard 1 in response to the speaking speed of the operator or in other words the arriving speed of the speech message. The signal $TR_2$ is a reference value for extracting the medium voice VM out of the phoneme components in $VO_P$ and $VC_P$ and is utilized to generate a signal for recognizing an open voice VO or closed voice VC when the duration, that is, the counted value of the counter 39 exceeds the signal $TR_2$ and to be a medium voice VM when the duration, that is, the counted value of the counter 39 is below $TR_2$. Result of the comparison of a comparing circuit 41 are given to a discriminating circuit 42 which provides a signal for distinguishing the open voice VO, closed voice VC and medium voice VM from each other in response to the signals SO and SC being given from the timing circuit 40 in response to $VO_P$ and $VC_P$, strobe signal VSTB and comparison result of the comparing circuit 41. When $VO_P$ is on a high level, the SO pulse is provided from the timing circuit 40 and a comparison result as to whether the high level period of $VO_P$ is larger or smaller than the reference value $TR_2$ is provided from the comparing circuit 41 so that, when the high level period of $VO_P$ is larger than the reference value $TR_2$, a symbolizing circuit 42 provides a pulse showing that the sound is the open voice VO in response to the strobe signal VSTB and, when the high level period of $VO_P$ is smaller than the reference value $TR_2$, the symbolizing circuit 42 provides a pulse showing that the sound is the medium voice VM also in response to the strobe signal VSTB. When $VC_P$ is on a high level, an SC pulse is provided by the timing circuit 40 while a comparison result as to whether the high level period is larger or smaller than the reference value $TR_2$ is provided by the comparing circuit 41. If the high level period of $VC_P$ is larger than the reference value $TR_2$, the symbolizing circuit 42 provides a pulse showing that the sound is the closed voice VC in response to the strobe signal VSTB but, in case the high level period of $VC_P$ is smaller than the reference value $TR_2$, the symbolizing circuit 42 provides a pulse showing that the sound is the medium voice VM also in response to the strobe signal VSTB. Therefore, the output signals VO and VC of the symbolizing circuit 42 will be respectively "1" and "0" in the case of the open voice VO, "0" and "1" in the case of the closed voice VC and "0" and "0" in the case of the medium voice VM. The output signals VO and VC of the symbolizing circuit 42 are put into the latch circuit 43 by the strobe signal VSTB and, when the output signal V of the output signals V, PL and F of the discriminating circuit 27 is confirmed to be on a high level, then they are provided to the I/O port 14. These output signals VO and VC are represented in FIG. 23 as $DF_2$ and $DF_3$ including the positionings. The latch circuit 44 stores the counted value of the counter 39 in response to the strobe signal VSTB and also provides the value to the I/O port 14 so as to be utilized in the case of utilizing the durations for recognizing the signals VO and VC. After the outputs of the latch circuits 43 and 44 are provided into the I/O port 14, a READY signal SRDY is provided out of the timing circuit 40.

The signal CR being given to the clock generating circuit 20 from the I/O port 14 is a signal for selectively rendering the outputs $C_P$ and TM of the clock generating circuit 20 to be provided out of the same.

CPU 4 causes the respective signals $DF_0$, $DF_1$, $DF_2$, $DF_3$ and further the output signal of the latch circuit 44 to be stored in the reference pattern memory system 7 or in the speech message memory system 15 in response to signals from RAM 3 and ROM 5. That is, the signals $DF_0$, $DF_1$, $DF_2$ and $DF_3$ showing the classification of the silent sound S, open voice VO, closed voice VC, medium voice VM, unvoiced fricative F and unvoiced explosive PL as well as the signals showing the durations of the open, closed and medium voices VO, VC and VM are stored in the memory systems. Thereafter, CPU 4 compares these classified signals and durations with those of the preliminarily stored reference patterns for the recognition of the message (see the pattern 2 in FIG. 22). In this case, the recognizing operation can be well simplified if the classified signals are compared prior to the durations and the durations are compared only when the classified signals show a coincidence with the reference patterns. Further, in comparing the durations, it is most preferable that they are subjected to a normalization. If the entire speech message coincides with one of the reference patterns in this recognizing operation, a command signal for properly controlling such instrument as the massager responsive to the given speech message will be provided.

In the embodiment shown in FIG. 23, the step of preparing the classified signals and durations from the signals $V_A$, $UV_A$, $VO_A$ and $VC_A$ is performed by means of such circuit arrangement as shown, but it will be evident that the step may be performed in CPU 4. A flow chart of the embodiment of FIG. 23 will be clear in view of FIGS. 16 and 18 and is thus omitted here.

Figure 24:
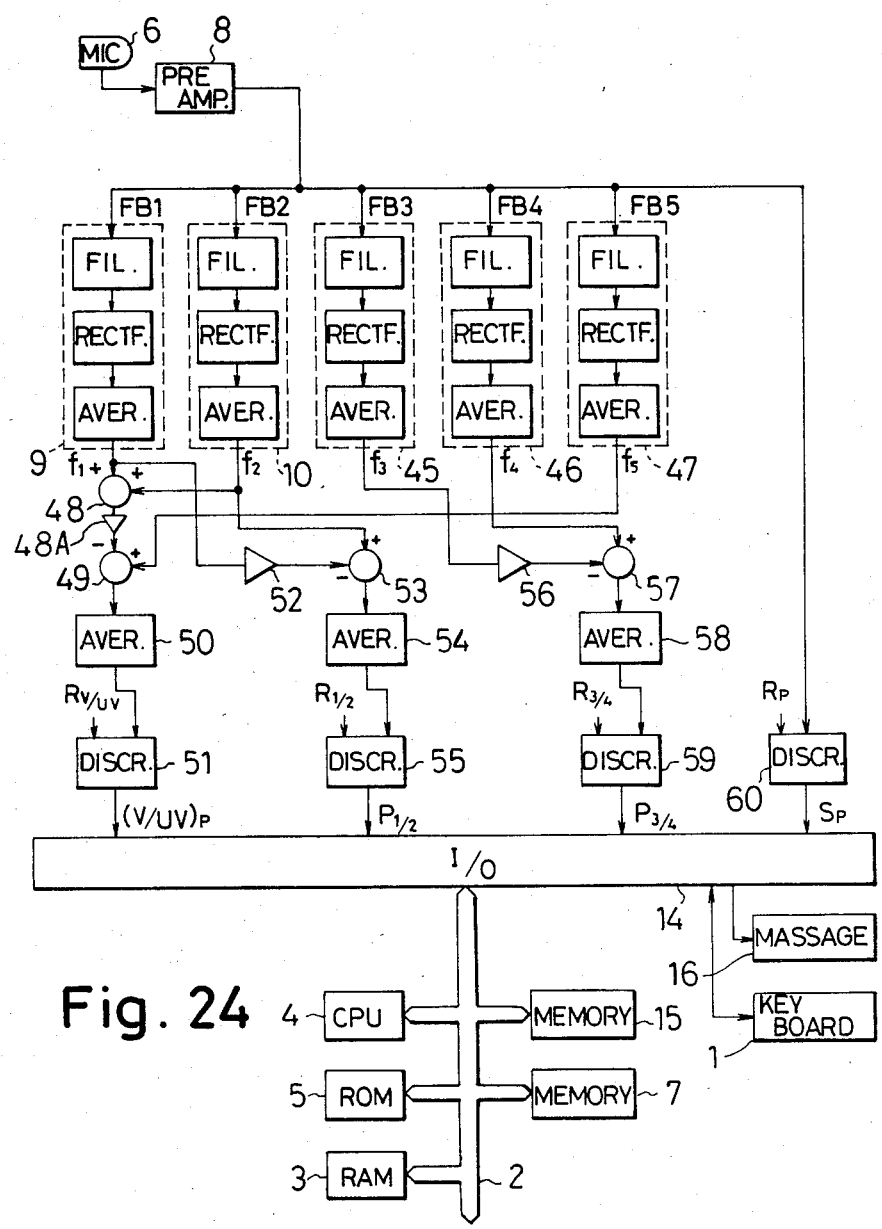
Figure 25A:
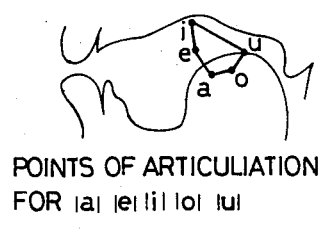
FIGS. 25A to 25C are diagrams for explaining operations of the circuit shown in FIG. 24.
Figure 25B:
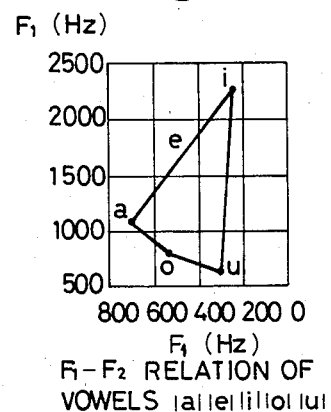
Figure 25C:
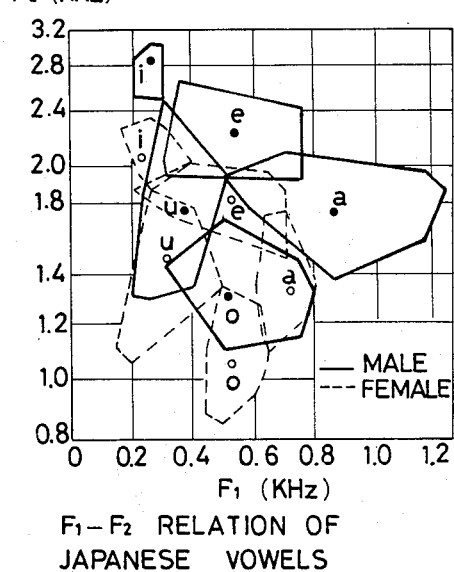

FIG. 24 is a further practical example of the embodiment shown in FIG. 14, wherein the speech message X(t) obtained through the microphone 6 is amplified by the amplifier 8 and transmitted to the input ends of the respective first to fifth filter banks 9, 10, 45, 46 and 47. These filter banks comprise respectively a series circuit of a filter, rectifying circuit and averaging circuit which comprises an integrating circuit, in which the filter passes a frequency component of less than 0.5 KHz in the first filter bank 9, 0.5 to 1.0 KHz in the second filter bank 10, 0.8 to 1.8 KHz in the third filter bank 45 and 1.8 to 3.2 KHz in the fourth filter bank 46, and the integrating circuit has a time constant of about 5.5 m.sec. in the first and second filter banks 9 and 10 and of about 3 m.sec. in the third and fourth filter banks 45 and 46. By references to FIGS. 25A to 25C, it should be clear that, by means of the third and fourth filter banks 45 and 46, outputs corresponding to articulations at front and rear positions of a tongue position divided into two in respect of the second formant. In the drawings, FIG. 25A shows points of articulations for /a/, /e/, /i/, /o/ and /u/, FIG. 25B shows relations in the first and second formants $F_1$ and $F_2$ between respective /a/, /e/, /i/, /o/ and /u/, and FIG. 25C also shows the $F_1$ and $F_2$ relations between these vowels specifically in the case of Japanese language. The points of articulation for these vowels in Japanese language are slightly deviated inward.

In the fifth filter bank 47, the filter passes a frequency component of 5.0 to 12.0 KHz and the integrating circuit has a time constant of about 1 m.sec. On the other hand, the averaging circuit in the respective first to fifth filter banks 9, 10, 45, 46 and 47 is of a cut-off frequency of 29 Hz, 29 Hz, 53 Hz, 53 Hz and 159 Hz, respectively.

Respective band outputs $f_1$ and $f_2$ of the first and second filter banks are added to each other at an adder 48 and, thereafter, the sum is processed at a coefficient multiplier 48A to have a relation of −6 dB/oct respect to a band output $f_5$ of the fifth band filter 47 at a differential amplifier 49 and is subtracted from the band output $f_5$. Outputs $f_5-(f_1+f_2)$ of this amplifier 49 are provided through an amplifying-averaging circuit 50 to a discriminating circuit 51. While this discriminating circuit 51 has a predetermined set referential value $R_{V/UV}$ and the circuit is to process the input signals depending on the value $R_{V/Uv}$, the threshold value at the time of transitions of $f_5-(f_1+f_2)$ or the voiced and unvoiced sound signals V and UV from the unvoiced sound UV period to the voiced sound V period is made to be $R_V$ ($\neq R_{V/UV}$, normally) and the threshold value of tansitions from the voiced sound V period to the unvoiced sound UV period is made to be $R_{UV}$ ($\neq R_V$), whereby outputs (V/UV)$_P$ of the discriminating circuit 51 are to be on a high level while they are in the voiced sound V period and faithfully representing the voiced sound period.

The band output $f_1$ of the first filter bank 9 is processed at a coefficient multiplier 52 to have a relation of −6 dB/oct with respect to the band output $f_2$ of the second filter bank 10 and is subtracted from the band output $f_2$ at a differential amplifier 53 outputs of which are provided through an amplifying-averaging circuit 54 to a discriminating circuit 55. A set referential value $R_{\frac{1}{2}}$ of this discriminating circuit 55 is predetermined, so that the circuit processes respective input signals depending on the referential value $R_{\frac{1}{2}}$ with a threshold value at the time of transitions from the closed voice VC to the open voice VO made to be $R_1$ ($\neq R_{\frac{1}{2}}$, normally) and with a threshold value at the time of transitions from the open voice VO to the closed voice VC made to be $R_2$ ($\neq R_1$), whereby outputs of the discriminating circuit 55 is made to be on a high level during the open voice VO period and the particular period is faithfully represented. Further, the band output $f_3$ of the third filter bank 45 is caused by a coefficient multiplier 56 to achieve a relation of −6 dB/oct with respect to the band output $f_4$ of the fourth filter bank 46 and is subtracted from this output $f_4$ in a differential amplifier 57 outputs of which are provided through the amplifying-averaging circuit 58 to a discriminating circuits 59. The discriminating circuit 59 has a predetermined set referential value $R_{\frac{3}{4}}$ and processes respective input signals depending on this referential value, with a threshold value upon transitions from a rear voice VR to a front voice VF made to be $R_3$ ($\neq R_{\frac{3}{4}}$, normally) and with a threshold value upon transitions from the front voice VF to the rear voice VR made to be $R_4$ ($\neq R_3$). A discriminating circuit 60 is further provided for producing signals $S_P$ representing that the signal X(t) is of a voiced or unvoiced sound when the signal exceeds the reference value $R_P$ and is of a silent sound when it does not exceed the value, whereby the four signals of (V/UV)$_P$, $P_{178}$, $P_{\frac{3}{4}}$ and $S_P$ are provided to the I/O port 14 and are utilized as four-bit signals $P_t = ((V/UV)_{Pt}, P_{178\ t}, P_{\frac{3}{4}t}, S_{Pt})$ for a distance calculation.

Referring to practical examples of the above four-bit signal Pt consisting of ((V/UV)$_{Pt}$, $P_{\frac{1}{2}t}$, $P_{\frac{3}{4}t}$, $S_{Pt}$), /a/ is to be (1, 1, 0, 1) and /i/ is to be (1, 0, 1, 1). While the signal $P_t$ is provided to CPU 4 at a predetermined sampling cycle (properly selected in a range of 5 to 20 m.sec. depending on the speaking speed), the signal $P_t$ (phoneme vector) is stored in the reference pattern memory system 7 (as represented to be $Q_{st}$) or in the speech message memory system 5 only when the same bit pattern is presented to CPU 4 sequentially more than a predetermined number of times (for instance, twice or three times) in order to avoid any erroneous recognition. The reference pattern $Q_{st} = ((V/UV)_{Pst}, P_{\frac{1}{2}st}, P_{\frac{3}{4}st}, S_{Pst})$ may be formed in the same manner as the bit signal $P_t$ referred to above.

In CPU 4, next, the distance between the signals prepared from the speech message X(t), that is, the phoneme vector Pt and the phoneme vector $Q_{st}$ of the reference pattern is calculated. It will be clear that the distance between the phoneme vector $P_t$ corresponding to the respective phonemes of the speech message X and the phoneme vector $Q_{st}$ corresponding to the respective phonemes of the reference pattern can be expressed by the following formula using the exclusive OR $\oplus$:

$$\Sigma_t\{Q_{st} - P_t\} = \Sigma_t\{((V/UV)_{Pst} \oplus (V/UV)_{st}) + (P_{\frac{1}{2}st} \oplus P_{\frac{1}{2}t}) + (P_{\frac{3}{4}st} \oplus P_{\frac{3}{4}t}) + (S_{Pst} \oplus S_{pt})$$

The reference pattern in the case where $\Sigma_t\{Q_{st}-P_t\}$ is below the predetermined value and the minimum, that is, the pattern corresponding to "s" in the case where $\Sigma_t\{Q_{st} - P_t\}$ is below the predetermined value and the minimum is to be recognized as being the contents of the speech message X and is transmitted through the bus line 2 and I/O port 14 to such instrument as the massager to have a proper operation performed by the same.

In an event where $\Sigma_t\{Q_{st} - P_t\}$ does not become below the predetermined value with respect to all "s", in the present embodiment, it is decided that there is no reference pattern which is applicable to the speech message X and no pertinent reference pattern exists or that, in other words, the given speech message X is not a proper command, and a re-entry of the message is indicated to be necessary. Also in an event when the difference between the minimum value of $\Sigma_t\{Q_{st} - P_t\}$ and a next value, that is, the penultimate value from the minimum is less than a predetermined value, the re-entry is requested in order to avoid any erroneous recognition. It will be apparent that, as required, a single control signal for the equipment to be controlled may be made to correspond to a plurality of the reference patterns so that the safe equipment operation may be achieved by means of respectively different speech messages.

The capacity of CPU 4 in the case of the above embodiment of FIG. 24 can be reduced more remarkably than in the case of prior art. This shall be explained in the followings employing the foregoing example of the speech message /senakaosasure/. Since this message comprises 13 phonemes, the message volume of the four bit signal $P_t$ will be $4 \times 13 = 52$ bits. Accordingly, it will be apparent that, while conventional 4-bit CPU has required 800 bytes for processing the speech message of 2 sec. length, the present invention can achieve a remarkable reduction of such processing time, practically to be 20 to 30 bytes. It is found that, when there are about 16 types of the speech messages, they can be well recognized only by using the four bit signal $P_t = ((V/UV)_{Pt}, P_{3/4})$ and two bit signal. This may be readily apparent from that the signals relating to the voiced sound V and unvoiced sound UV as well as the signals relating to the second formant at which the frequency spectrum difference of the five vowels of /a/, /o/, /u/, e/ and /i/ is the largest are utilized.

Figure 18:
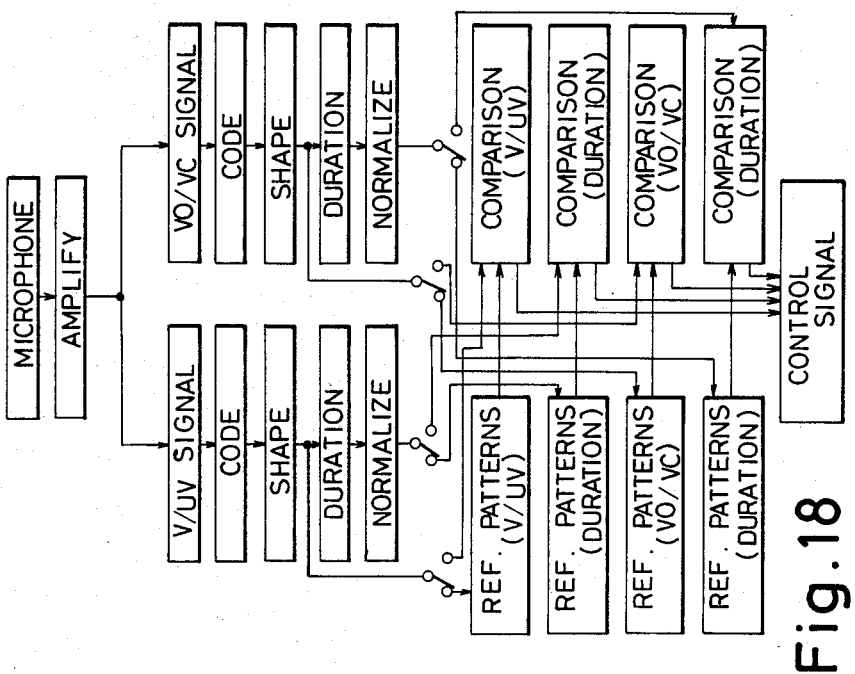

A flow chart of the above embodiment shown in FIG. 24 will be self-evident in view of FIGS. 16 and 18 and is thus omitted here.

Figure 26:
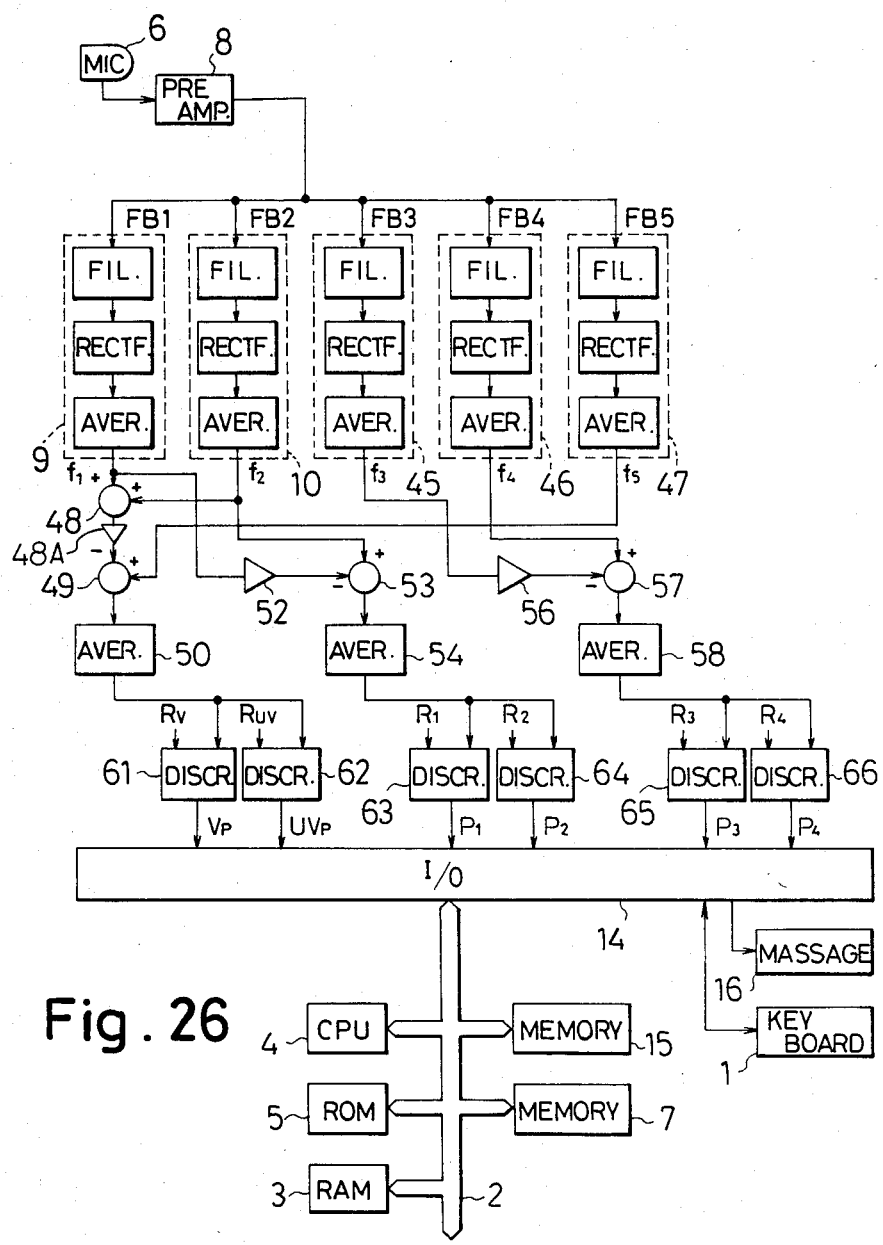

FIG. 26 shows still another embodiment of the present invention, wherein the discriminating circuits 51, 55, 59 and 60 in FIG. 24 are removed, the same discriminating circuits 61 and 62 as those 36 and 37 in FIG. 23 are connected to the amplifying-averaging circuit 50, and such modifications as follows are made. A pair of discriminating circuits 63 and 64 are connected to the amplifying-averaging circuit 54, wherein the circuit 63 compares the outputs of the amplifying-averaging circuit 54 with the reference value $R_1$ and generates a signal $P_1$ which is on the high level only when the outputs of the circuit 54 are larger than the reference value $R_1$, while the other circuit 64 compares the same outputs of the circuit 54 with another reference value $R_2$ and generates a signal $P_2$ which is on the high level only when the compared signals are smaller than the value $R_2$. A further pair of discriminating circuits 65 and 66 are connected to the amplifying-averaging circuit 58 so that the discriminating circuit 65 compares the outputs from the circuit 58 with the reference value $R_3$ to generate a signal $P_3$ which is on the high level only when the compared signals are larger than the value $R_3$ while the other circuit 66 compares the same outputs from the circuit 58 with the reference value $R_4$ to generate a signal $P_4$ which is on the high level upon the compared signals smaller than the value $R_4$. With this arrangement, such six signals as $V_P$, $UV_P$ and $P_1$ through $P_4$ are provided to the I/O port 14 and CPU 4 utilizes them as 6-bit signals $P_t = (V_{Pt}, UV_{Pt}, P_{1t}, P_{2t}, P_{3t}, P_{4t})$ for the distance calculation. Further processings of the signals for the message recognition are performed as has been disclosed with reference to the foregoing embodiment of FIG. 24.

Figure 27A:
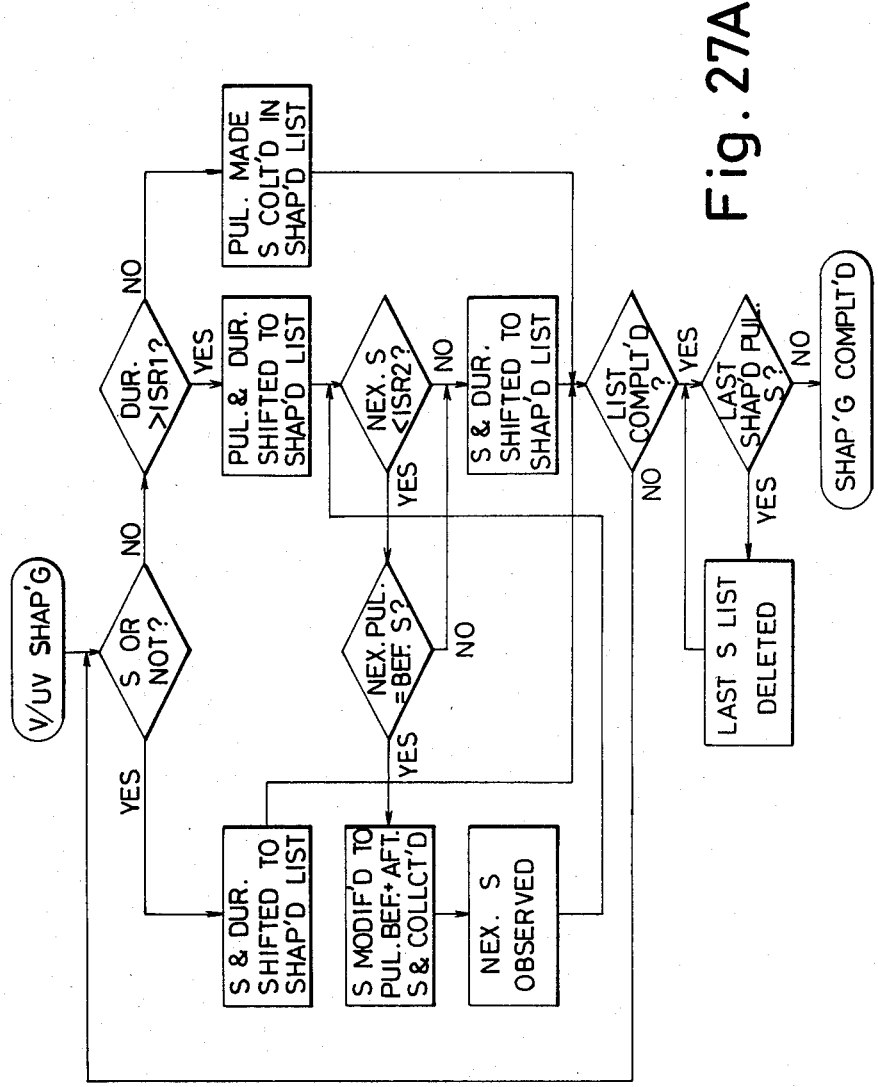

FIG. 27 shows more practical flow charts which can be used respectively as the one for each of the embodiments of FIGS. 5, 14, 23, 24 and 26, and the flow charts are specifically in the case of a programed processing in CPU 4 for the voiced and unvoiced signals V and UV obtained by the above referred embodiments and for their pulse signals. The flow chart of FIG. 27A is of a shaping program for the signals V and UV, wherein unshaped signals V and UV (those in an unshaped list) written into CPU 4 are first subjected to a determination whether their first pulse is or not of the silent sound S. When the first pulse is of S, the same and its duration are shifted to a shaped list. When a second pulse in the unshaped list is, for example, not S, it is determined if its duration is or not larger than a predetermined value iSR1. If the duration is not larger than the value, then the second pulse is interpreted to be S and collected in the shaped list but, if the duration is larger, the second pulse and its duration are shifted into the shaped list. The determination is continued on a third pulse of the unshaped list to see if the pulse is or not S and its duration is or not smaller than a predetermined value iSR2. If not smaller, the third pulse and its duration are shifted as being of S to the shaped list and, if smaller, it is determined if a fourth pulse is or not identical to the second pulse. If not identical, the third pulse and its duration are shifted as being of S to the shaped list while, if identical, the third pulse is modified to be the second and fourth pulses and is collected in the shaped list. Then, a search is made for a first one of the silent sound S appearing in fifth and following pulses in the unshaped list. It is determined whether the newest S is smaller than the value iSR2 or not, and then the same operations as above are repeated. When the unshaped list is thus fully processed for the shaping, it is determined if the last pulse in the list is S or not and, if yes, the last S is deleted on the shaped list but, if not, the shaping operation is terminated.

Since the shaping program for the open and closed voice signals VO and VC is totally identical to the foregoing program of FIG. 27A for the signals V and UV and references thereto shall be omitted.

The flow chart shown in FIG. 27B is of a program for preparing composite signals from the shaped V and UV signals and VO and VC signals. A determination is made to see whether the respective pulses in the shaped list of the V and UV signals are the silent sound S or unvoiced sound UV. In the case when S or UV is determined, S or UV and its duration are shifted into a composite pulse list. When the pulse is not S or UV or the shiftings of S and UV into the composite pulse list are completed, it is determined if VO in the shaped list of the open and closed voice signals VO and VC exists in the period of the voiced sound V in the shaped list of the voiced and unvoiced sound signals V and UV.

When it is determined that VO exists in the V period, this VO is shifted to the composite pulse list. In the event of no VO existing in the V period or completion of shifting of VO into the composite pulse list, then it is determined whether VC exists or not in the V period. When VC exists in the V period, this VC is shifted to the composite pulse list. If no VC exists in the V period or the VC shifting into the composite pulse list is completed, then it is determined if the silent sound S in the shaped list of the signals VO and VC exists or not in the V period. When S exists, this S is interpreted to be the medium voice VM and shifted into the composite pulse list. In the event of absence of S in the V period or shifting completion of VM into the list, the preparing operation of the composite pulses is completed.

In FIG. 27C, a flow chart of a program for hierarchically classifying the composite pulse list is shown. Out of the list, initially, V and UV are selected as classified into the first hierarchy. With n=1, that is, for the first V, it is determined if VM, VO and VC exist in the list. Upon presence of VM, VO and VC, they are classified as V(1) in the second hierarchy. Then, with n=n+1, thus, for the second V, it is determined if VM, VO and VC exist or not in the list. The processing is repeated in the same manner up to the last V. In the state of completion of the processing up to the last V where V(n) is classified into the second hierarchy, there exists no VM, VO or VC for n+1. Accordingly, it has been here achieved that the list of "n" pieces of V(n) is prepared as the second hierarchy. In the step of the hierarchical classification, as will be clear in view of the foregoings, the list consisting of V, UV and S is prepared as the first hierarchy, and another list comprising VM, VO and VC which are representing V in the first hierarchy list and made sequentially to be V(1), V(2) ... V(n) in prepared as the second hierarchy. Results of this hierarchical classification may be shown as in FIG. 28, for the speech message of /senakaosasure/.

Figure 27D:
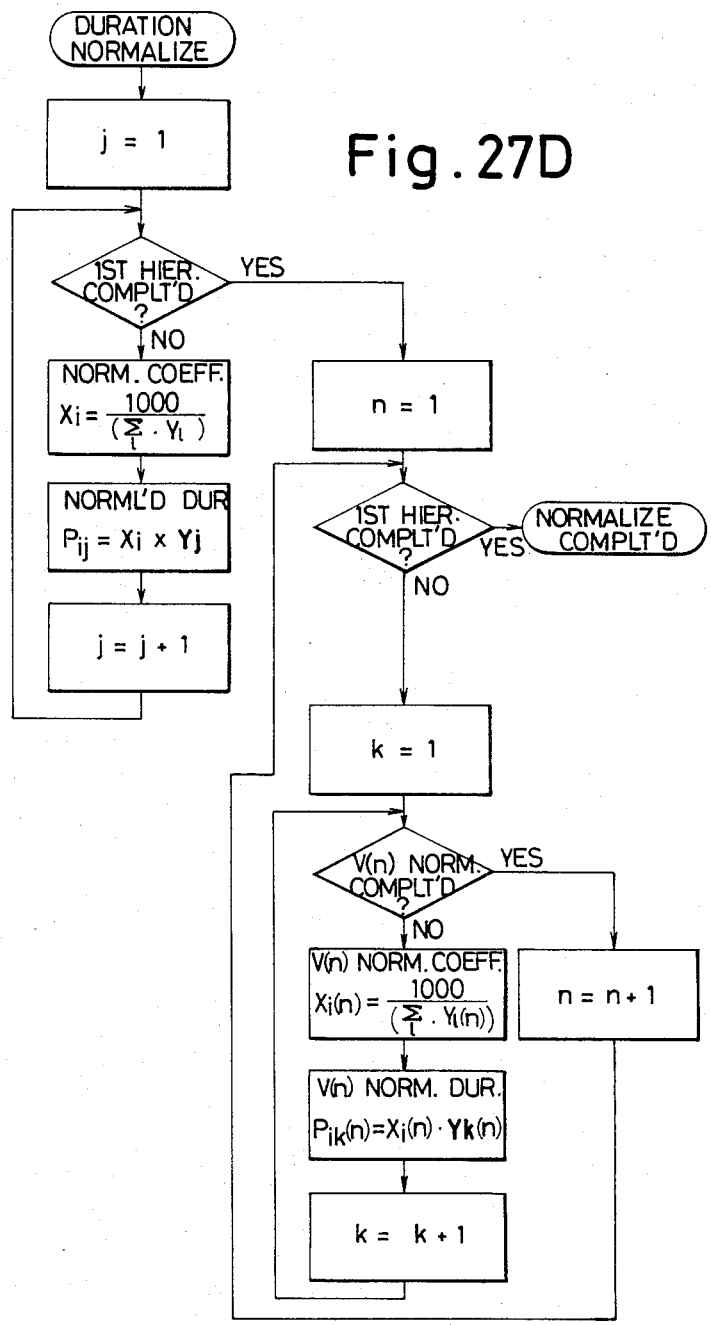

FIG. 27D shows in the flow chart a program for normalizing the duration of the respective elements in the first and second hierarchy lists classified according to FIG. 27C, wherein j=1, and it is determined whether the normalization of the first hierarchy list has been all completed. In the event when not completed yet, the durations of the elements classified in the first hierarchy are normalized. That is, the normalization coefficient $X_i = 1000/(\Sigma_1 Y_1)$ ($Y_1$ being the duration of "1"th element in the first hierarchy list) of the speech message to be processed (made to be "i"th speech message) is obtained first. Then, the first normalized duration $P_{ij} = X_i \cdot Y_j$ of this message is obtained (j=1) and, thereafter, the normalization is repeated with j=j+1 until the last element of the first hierarchy list is normalized (practical numerical values are shown in FIG. 28). Upon completion of the normalization of the first hierarchy list, it is determined, with n=1, whether the second hierarchy list has been fully normalized or not. If determined not to have been completed, the duration of V(1) element is normalized. With k=1, a determination is made whether the durations of elements of V(1) are all normalized or not. If not completed yet, the normalization coefficient $X_i(1) = 1000/(\Sigma_1 Y_1(1))$ ($Y_1$ being the duration of "1"th element of V(1)) is obtained. Then, the first normalized duration $P_{ik}(1) = X_i(1) \cdot Y_k(1)$ (k=1) is obtained for V(1). Thereafter, the normalization is repeated up to the last element of V(1), with k=k+1. After completion of the normalization for V(1), the normalization is performed for V(2) ... V(n) in the second hierarchy list, with n=n+1, in the same manner as above. Upon completion of the normalization for the second hierarchy list, the duration normalization is completed. References to, for example, FIG. 28 will expedite a further understanding of the normalization.

Figure 27E:
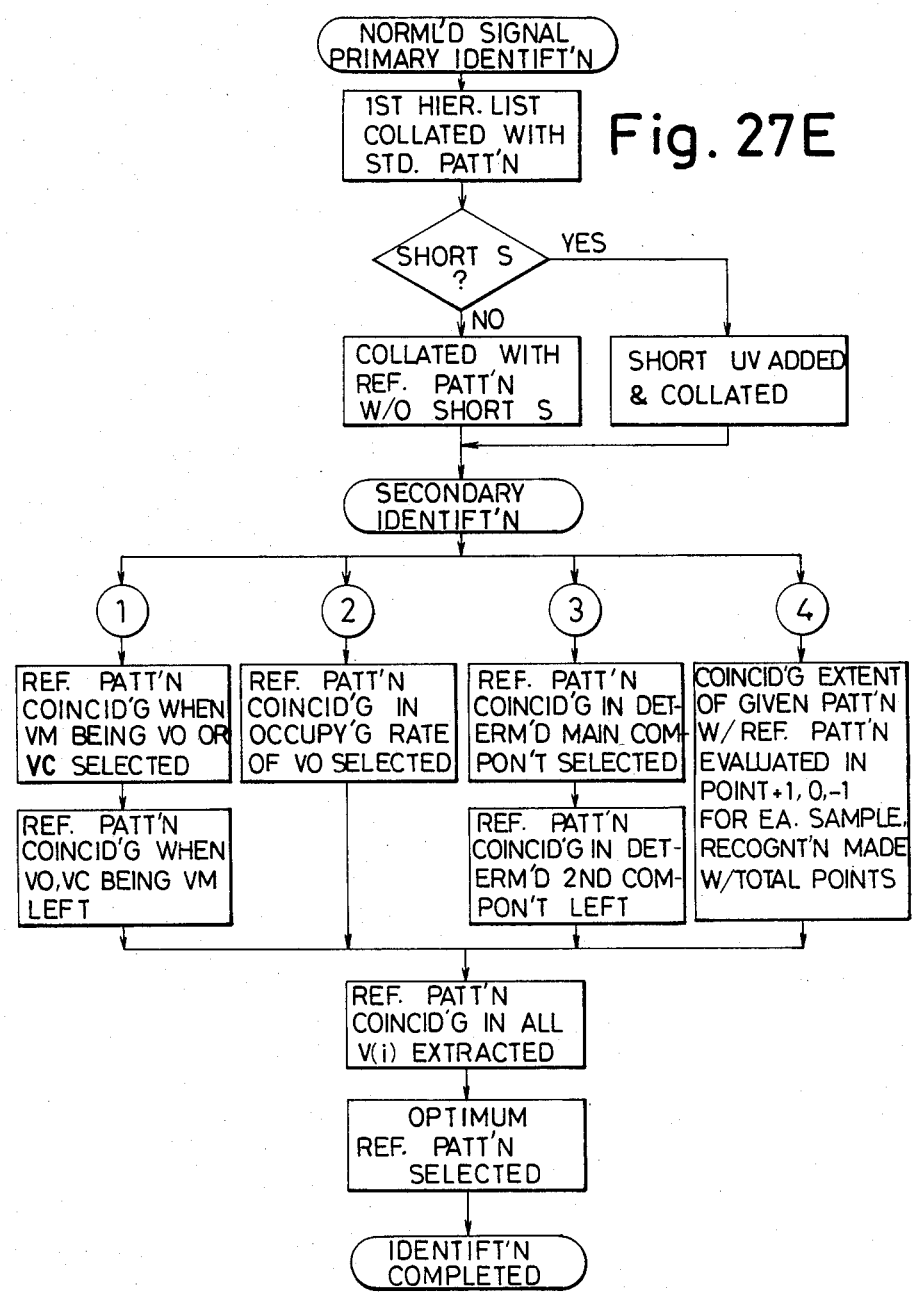

FIG. 27E shows in a flow chart a program for identifying the signals normalized in FIG. 27D. At a primary identification, the normalized first hierarchy list is collated with the reference patterns, in view of the number of respective V, UV and S included in the first hierarchy list. When there is no S which is of a short duration, the signals are collated with the reference patterns having no short S, while the signals having the short S are collated as interpreted to have UV next to the short S. In performing the collation, the normalizing time is also viewed. When the message is found in the primary identification to be applicable to any ones of the reference patterns, a secondary identification is further performed, for which purpose the normalized second hierarchy is utilized. Thus, V(1) ... V(n) are sequentially collated. As seen in the drawing, the collation is performed in four routes, in which case it is allowed to be sufficient that the respective signals are found to be corresponding to the patterns selected at the primary identification in either one of the four routes. In the first route, the reference patterns which coincide with, for example, V(1) in which VM is made to be VO or VC are selected, and then the reference pattern or patterns coinciding with V(1) wherein VO and VC being VM is left. In the second route, the reference patterns coinciding with V(1) in the rate occupied by VO are selected. In the third route, the main component of V(1) is determined to be either one of VO, VC and VM, the reference patterns coinciding in such component are selected, second component of V(1) is determined to be either one of VO, VC and VM, and then the pattern or patterns coinciding in this respect is left. In the third route, specifically, the respective components of V(1) are arranged sequentially from the one having a longer duration to the one having the shortest duration, and the pattern or patterns coinciding in such sequence is selected. In the fourth route, such "points" as in the following table are utilized as a function denoting the extent of the coincidence which corresponding to the distance between the input pattern of V(i) wherein (i) being 1 to n in the signals V(1) ... V(n) and the reference pattern:

| Input Pattern | Reference Pattern | Point |
| --- | --- | --- |
| VM | VO/VC | 0 |
| VO/VC | VM | 0 |
| VO | VO | +1 |
| VM | VM | +1 |
| VC | VC | +1 |
| VO | VC | −1 |
| VC | VO | −1 |

The reference patterns showing that the grand sum of the points calculated for every sample or for every sample which corresponding to the normalizing time is above a predetermined value, are extracted (the total sample number is, for instance, 1000). When the input pattern fully coincides with the reference pattern, the total sample number will be the foregoing grand sum. While the fourth route thus defines the "points" in respect of wave form, it will be readily understood that the definition may be made with respect to the symbolized pulse or the normalized duration date.

Now, the reference patterns selected thus in the respective first to fourth routes and further coinciding in respect of all V(i) are extracted and, from these extracted ones, the optimum reference pattern is selected, whereby the recognizing operation is completed. When the optimum one of the reference patterns could be selected, a command corresponding to this optimum pattern should be provided through the bus line 2 and I/O port 14 to such associated equipment as massager 16 but, when no optimum pattern could be selected, a re-entry of the speech message should be requested to the operator.

While such four routes as in the above have been referred to for performing the secondary identification at the second hierarchy in the flow chart of FIG. 27E, it may be possible to omit some of the first to fourth routes as required.

Further, in the embodiments shown in FIGS. 24 and 26, it will be evident that results can be further simulated to models at the end hearing organ of human being when the LOG amplifier is inserted at each of the two input ends of the respective differential amplifiers 49, 53 and 57 or between the rectifying circuit and the averaging circuit in each of the respective first to fifth filter banks 9, 10, 45, 46 and 47. Advantages achievable in this case may be readily understood upon referring to the LOG amplifiers 32A and 33A as in FIG. 23, while detailed references thereto shall be omitted here.

As will be clear in the foregoings, the present invention prepares a plurality of the reference patterns in recognizing a specific speech message for the purpose of ensuring a certain extent of freedom in the handling and recognizing abilities. It is found in our experiments that, in contrast to the voiced and unvoiced signals V and UV, the open and closed voice signals VO and VC are variable under influences of the individual phonetic differences or some other conditions. Referring to this with reference to the foregoing speech message /senakaosasure/ and FIG. 29 showing the phoneme patterns of this message, it is seen that the voiced sound V zone includes at least two different articulations whereas the unvoiced sound UV zone possibly disappears only in a special case, that is, following the short silence sound S. Therefore, a reference pattern is prepared so that the unvoiced sound UV can be recognized to exist irrespective of whether it vanishes or not at the position following the short silent sound S. Further, it will be evident that, if the voiced sound V is handled on the assumption that the medium voice VM interposed between the open and closed voices VO and VC can be pronounced either as the open voice VO or the closed voice VC, such various cases as in FIG. 29 can be all included.

In the case of utilizing only the voiced and unvoiced signals V and UV, on the other hand, it will be clear that the recognition may be performed on the ground that, determining whether the silent sound S is short or not, the unvoiced sound UV follows the sound S only when the latter is short.

In the case of utilizing both the voiced and unvoiced signals V, UV and open and closed voice signals VO, VC, it is possible to take into considerations not only the vanishing phenomenon of the unvoiced sound UV after the silent sound S but also the presence and variation of the medium voice VM. It is still necessary in this case, however, to preliminarily measure the durations. It should be understood that, in this case, the foregoing processing upon the presence of the short silent sound S should be simultaneously performed and a further preferable result should be achieved.

The preferable preparation or registration of the reference patterns of the present invention shall now be referred to with reference to FIG. 30, according to which any unreliability as well as non-determinative nature due to the phonetic difference in the individual operators or the like are taken into considerations. When an incoming speech message required to be processed includes a portion of the silent sound S→unvoiced sound UV→voiced sound V, a pattern with UV vanished is also prepared. Similarly, when a portion of S→V is included, a pattern including the S→UV→V portion is also prepared. When the message is not including the S→UV→V portion nor the S→V portion, the pattern is remained as it stands. Then, whether the program is in a learning mode or not is checked and the processing is further performed through the left side series of steps in FIG. 30 if the program is in the learning mode but, if not, through the right side series of steps. For that of the learning mode, the durations or the normalized durations of the voiced and unvoiced sound signals V and UV are averaged. The signals are then coded or symbolized as divided into a proper number of time regions for every V(i), and the same time regions which are of the same symbol are made to be the core while other regions than the core are made to be branches respectively of VM, VM and VO or of VM and VC, whereby the reference patterns have now been prepared. In the case of the program not in the learning mode, the initiation of the speech prepares a proper pattern by means of VO and VC, and then the pattern is made to be of the speech terminating with VO and VC, while its intermediate portion is properly processed in the manner of VC→VO and VO→VC, whereby the reference patterns have been prepared, and the last prepared reference pattern is written in or registered into the reference pattern memory system 7.

Referring further in detail to the above reference pattern preparing steps by means of the learning mode with reference to FIGS. 31 to 33, the flow chart shown in FIG. 31 can be utilized for both the same speaker and a plurality of different speakers, but the following explanations shall be made on a case where the same speaker gives a speech repetitively many times (specifically 5 times in the present instance). Initially, the time region is divided into 10 sections as seen in FIG. 32A (each section may be of, for example, 5 m.sec. but may be made shorter than that). When the normalized duration is to be divided, it should be clear that the divided regions may be of a proper number depending on the words given. After the division, the same time regions of which symbols (VO, VC, VM and the like) do not vary are made to be a core. Referring to the patterns (a) through (e) in FIG. 32A, the regions of VO are made to be the core. After the core is thus obtained, the same time regions but of varying symbols are made to be VM (see FIGS. 32A and 32B), whereby a reference pattern A having VO made as the core has now been prepared (FIG. 32B). When any pattern including VM or VC in the same time regions, a branch of VC is made for VM of the reference pattern A (see FIGS. 32A and 32C). Similarly, in the case where VM or VO is included in the same time regions, a branch of VO is made for VM of the pattern A. When either of VO or VC is included in the same time regions, the regions are made to be of VM, whereby a reference pattern B in which branches are added to the pattern A is here prepared (FIG. 32C).

With these preparations of the reference patterns A and B, the preparing steps for the reference patterns based on the learning mode are completed. Thereafter, the operation is shifted to the writing step as in FIG. 30 and the reference patterns A and B are written into the memory system 7.

It is necessary in the above preparation of the reference patterns based on the learning mode that the gain, for example, on the input side of the differential amplifier 11-2 in FIG. 5 is in balanced state. For this purpose, the gain is adjusted so that there will be achieved, for instance, VO upon an articulation of /a/ and VC upon /i/. In view of the existing phonetic differences depending on the speaker, it is advantageous specifically for the recognition that the circuit arrangement is made so as to have the gain balance adjustment performed automatically so that the output of the differential amplifier will be "0" with respect to a naturally articulated /e/ only upon an arrival of a balance setting signal (not shown). With this balance adjustment, it is made possible to prepare the non-determinative reference patterns having the branches without performing the repetitive speeches of the same speech message as well as the learning of them, as shown in a flow chart of FIG. 33.

Thus, FIG. 33 shows in details the reference pattern preparing steps in the case of not in the learning mode, wherein, in the representation of the voiced and unvoiced sound signals V and UV, the V signals are sequentially processed. When the respective V articulations start with VC, a branch of VM is added. When it starts with VO instead of VC, branches of VC and VM are parallelly inserted between the start and VO and a VM branch is parallelly added to VO. When the respective V articulations start with others than VC or VO, they are made to be VM.

When the respective V articulations end with VC, next, a parallel VM branch is added to VC. When they end with VO, they are made to end with VO→VC and a parallel VM branch is added to each of VO and VC. When the ending is not with VC or VO, the articulations are construed to be ending with VM.

Finally, whenever VC→VO portion exists in the course of V, a VM branch is parallelly added to each of VC and VO. In the absence of VC→VO but the presence of VO→VC, a VM branch is added to each of VO and VC. If the articulations end with neither of VC→VO or VO→VC, it is construed that the ending is VM.

With the foregoing, the reference pattern preparing steps in the case of not in the learning mode is completed. The operation is thereafter shifted to the writing step of the reference patterns as in FIG. 30 and the reference patterns thus prepared are written into the memory system.

Upon reading the foregoing references to FIGS. 27A to 27E and 30 to 33, it will be clear that the reference patterns can be prepared enough for covering such speech meaasge patterns shown in FIG. 28. In the present invention, the processing program is prepared as has been disclosed, so as to sufficiently cover all fluctuations accompanying the sequential articulations as in FIG. 28. It should be readily understood that, as will be clear in view of FIG. 28, the voiced and unvoiced sound signals V and UV are properly processed while they involve the short silent sound signals S interposed between the respective V and UV signals or VO and VC signals. A tendency that the medium voice signals VM are interposed between V and UV or VO and VC can be seen, but such message is also properly processed. According to the present invention, therefore, it will be clear that any undesirable influence due to fluctuations in the phoneme pattern of the speech message accompanied by the individual's phonetic differences, stress shiftings under various conditions and so on can be effectively removed. In other words, according to the present invention, the portions having less fluctuations in the phoneme pattern of the speech message are made to be the core of the reference pattern to be prepared whereas other portions of many fluctuations are made to be remaining portion, and the recognition or reference pattern preparation is performed first in respect to the core portion and next in respect to the remaining portion, with the provision thereto of the non-determinative nature or predetermined freedom. Consequently, it is made possible to reduce the capacity of the respective CPU and memory systems and to thereby shorten the required processing time to a remarkable extent. Additionally, in accordance with the present invention, the pertinent reference pattern is formed even with a single entry of the speech message as processed in CPU, without being based on the learning mode, so that the reference patterns can be highly efficiently prepared.

What we claim as our invention is:

1. A speech message recognizing method wherein a speech message is analyzed into a plurality of frequency bands, energies contained in respective said frequency bands are measured and a frequency band distribution of said energies is compared with reference patterns to recognize the contents of said speech message, said method comprising the steps of:
   (a) logarithmically compressing the amplitude of said speech message,
   (b) analyzing said amplitude-compressed speech message into a first frequency band in which the energies of voiced sounds concentrate, and a second frequency band in which the energies of unvoiced sounds concentrate,
   (c) obtaining a difference between the energies of voiced sound components belonging to said first frequency band and the energies of unvoiced sound components belonging to said second frequency band to generate voiced and unvoiced sound signals, and
   (d) comparing said voiced and unvoiced sound signals with respective said reference patterns to extract one of the reference patterns which is substantially identical to the signals.

2. A method according to claim 1 wherein said voiced and unvoiced sound signals are pulse signals.

3. A method according to claim 2 which further comprises the steps of:
   (e) measuring durations of respective voiced, unvoiced and silent sound periods in said voiced and unvoiced sound signals, and
   (f) comparing said durations measured at said step (e) with respective said reference patterns to extract one of the reference patterns which is substantially identical to the measured durations.

4. A method according to claim 3 which further comprises the step of:
   (g) processing to shape respective voiced, unvoiced and silent sound periods of the signals of said duration measured at said step (e) to be less than a predetermined value.

5. A method according to claim 4 wherein voiced and unvoiced sounds of said duration less than said predetermined value are processed as being silent sounds.

6. A method according to claim 5 wherein, when a voiced sound continues to a voiced sound of said duration measured to be above a predetermined value through a silent sound of a duration less than said predetermined value, said silent sound is processed as being a voiced sound and, when an unvoiced sound continues to an unvoiced sound of the duration measured to be above the predetermined value through the silent sound of the duration less than the predetermined value, said silent sound is processed as being an unvoiced sound.

7. A method according to claim 3 which further comprises the step of:
(h) normalizing said durations measured at said step (e) to thereby simplify said step (f).

8. A method according to claim 1 which further comprises the step of:
(i) coding said voiced and unvoiced sound signals by allotting +1 to the voiced sound, −1 to the unvoiced sound and 0 to said silent sound.

9. A method according to claim 7 which further comprises the step of:
(j) coding said normalized durations by allotting +1 to the duration above a predetermined value, −1 to the duration less than another predetermined value, and 0 to the duration between respective said predetermined values.

10. A method according to claim 4 wherein an unvoiced sound which continues to a silent sound of a duration above said predetermined value is processed as an unvoiced explosive when said unvoiced sound is of a duration less than the predetermined value, and as an unvoiced fricative when the unvoiced sound is of a duration above the predetermined value.

11. A method according to claim 1 wherein said compressing step is performed only when said amplitude is above a predetermined value.

12. A method according to claim 1 wherein said compressing step is performed to render a compressed amplitude to be of the width of a function of said speech message before being compressed.

13. A method according to claim 1 wherein said first frequency band is of 0 to 1.0 KHz and said second frequency band is of 2 to 12 KHz.

14. A speech message recognizing method wherein a speech message is analyzed into a plurality of frequency bands, energies contained in respective said frequency bands are measured and a frequency band distribution of said energies is compared with reference patterns to recognize the contents of said message, the method comprising the steps of:
(a) logarithmically compressing the amplitude of said speech message,
(b) analyzing said amplitude-compressed speech message into a first frequency band in which energies of voiced sounds concentrate, a second frequency band in which energies of unvoiced sounds concentrate, a third frequency band in which energies of open voices of said voiced sounds concentrate and a fourth frequency band in which energies of closed voices of said voiced sounds concentrate,
(c) obtaining a difference between respective energies of voiced sound components belonging to said first frequency band and of unvoiced sound components belonging to said second frequency band to generate voiced and unvoiced sound signals,
(d) obtaining a difference between respective energies of open voice components belonging to said third frequency band and of closed voice components belonging to said fourth frequency band to generate open and closed voice signals, and
(e) comparing said voiced and unvoiced sound signals and said open and closed voice signals with respective said reference patterns to extract one of the reference patterns which is substantially coinciding with the respective signals.

15. A method according to claim 14 wherein said open and closed voice signals are compared only with said reference pattern extracted by said comparison of said voiced and unvoiced sound signals.

16. A method according to claim 14 wherein said voiced and unvoiced sound signals and open and closed voice signals are respectively pulse signals.

17. A method according to claim 16 which further comprises the steps of:
(f) measuring durations of respective voiced, unvoiced and silent sound periods in said voiced and unvoiced sound signals as well as durations of respective open, closed and silent voice periods in said open and closed voice signals, and
(g) comparing respective said durations of said voiced, unvoiced and silent sound periods and of said open, closed and silent voice period with respective said reference patterns to extract one of the reference patterns which substantially coincides with the durations.

18. A method according to claim 17 which further comprises the step of:
(h) processing to shape said voiced, unvoiced and silent sound periods in said voiced and unvoiced signals and said open, closed and silent voice periods in the open and closed voice signals, when their measured durations are less than a predetermined value.

19. A method according to claim 18 wherein voiced and unvoiced sounds and open and closed voices of durations less than a predetermined value are processed as silent sounds.

20. A method according to claim 19 wherein a silent sound of a duration less than a predetermined value is processed as a voiced sound when interposed between a voiced sound of a duration above said value and another voiced sound but as an unvoiced sound when interposed between an unvoiced sound of a duration above the value and another unvoiced sound, and as an open voice when interposed between an open voice of a duration above the value and another open voice, but as a closed voice when interposed between a closed voice of a duration above the value and another closed voice.

21. A method according to claim 17 which further comprises the step of:
(i) normalizing said durations measured to thereby simplify said comparing and processing steps.

22. A method according to claim 14 which further comprises the steps of:
(j) coding respective said voiced and unvoiced sound signals and open and closed voice signals by allotting +1 to voiced sounds, −1 to unvoiced sounds and 0 to silent sounds in the voiced and unvoiced sound signals, and also allotting +1 to open voices, −1 to closed voices and 0 to silent sounds in the open and closed voice signals.

23. A method according to claim 21 which further comprises the step of:

(k) coding respective said durations normalized by allotting +1 to the one above a predetermined value, −1 to the one below another predetermined value, and 0 to the one between both of said predetermined values.

24. A method according to claim 18 wherein an unvoiced sound period continuing to a silent sound period of a duration above a predetermined value is processed as an unvoiced explosive when said unvoiced sound period duration is less than the predetermined value, but as an unvoiced fricative when the duration is above the value.

25. A method according to claim 14 wherein said compressing step is performed only when the amplitude of said message is above a predetermined level.

26. A method according to claim 14 wherein said compressing step is made so that the result of the compression is the width of a function of said speech message before being compressed.

27. A method according to claim 14 wherein said first frequency band is of 0 to 1.0 KHz, said second frequency band is of 2 to 12 KHz, said third frequency band is of 0 to 0.5 KHz and said fourth frequency band is of 0.5 to 1.0 KHz.

28. A speech message recognizing method wherein a speech message is analyzed into a plurality of frequency bands, energies contained in respective said frequency bands are measured and a frequency band distribution of said energies is compared with reference patterns to recognize the contents of said speech message, the method comprising the steps of:
 (a) subjecting said speech message to a logarithmic conversion,
 (b) analyzing said converted message into a first frequency band of 0 to 1 KHz in which energies of voiced sounds concentrate, a second frequency band of 2 to 12 KHz in which energies of unvoiced sounds concentrate, a third frequency band of 0 to 0.5 KHz in which energies of open voices in said voiced sounds concentrate, and a fourth frequency band of 0.5 to 1.0 KHz in which energies of closed voices in the voiced sounds concentrate,
 (c) obtaining a difference between energies of voiced sound components belonging to said first frequency band and of unvoiced sound components belonging to said second frequency band to generate voiced and unvoiced sound signals,
 (d) measuring durations of respective voiced, unvoiced and silent sound periods in said voiced and unvoiced sound signals,
 (e) obtaining a difference between respective energies of open voice components belonging to said third frequency band and of closed voice components belonging to said fourth frequency band to generate open and closed voice signals,
 (f) measuring durations of respective open, closed and silent voice periods in said open and closed voice signals,
 (g) processing to shape said voiced and unvoiced sounds and open and closed voices of said duration measured to be less than a predetermined value respectively as a silent sound, said silent sound of a duration less than said predetermined value and interposed between the voiced sound of a duration above the predetermined value and another voiced sound as a voiced sound, the silent sound less than the predetermined value and interposed between the unvoiced sound of a duration above the predetermined value and another silent sound as an unvoiced sound, the silent sound of a duration less than the predetermined value and interposed between an open voice of a duration above the predetermined value and another open voice as an open voice, and the silent sound of a duration less than the predetermined value and interposed between the closed voice of a duration above the predetermined value and another closed voice as a closed voice,
 (h) forming composite pulses with unvoiced and silent sound periods of shaped voiced and unvoiced signals respectively as unvoiced and silent sound periods, with open and closed voices of shape open and closed voice signals existing in correspondence to voiced sound periods of shaped voiced and unvoiced signals respectively as open and closed voices and with silent sounds of said shape open and closed voice signals existing in correspondence to said voiced sound periods of the shaped voiced and unvoiced sound signals as medium voices,
 (i) hierarchically classifying respective groups of said shaped voiced and unvoiced signals to be a first hierarchy and said open, closed and medium voices continuing to one another in said composite pulses to be a second hierarchy,
 (j) normalizing durations of said first hierarchy,
 (k) further normalizing durations of respective said groups of said second hierarchy,
 (l) comparing the respective signals at the first hierarchy with respective reference patterns to extract the ones of said reference patterns which are substantially coinciding with the signals, and
 (m) further comparing the respective signals at the second hierarchy with said extracted reference patterns to extract one of them which is substantially coinciding with the signals.

29. A method according to claim 28 which further comprises the step of:
 (n) discriminating whether optimum one of said reference patterns extracted at said step (m) is sufficiently distinctive from next pertinent reference pattern extracted, to generate a signal indicative of the necessity of re-entry of said message upon an insufficient distinctiveness.

30. A method according to claim 28 wherein said medium voices of respective said signal groups in said second hierarchy are compared as either one of open and closed voices with said reference patterns, said open and closed voices in respective said groups at said second hierarchy are compared as medium voices with said reference patterns extracted by said comparison, a reference pattern having the open voices of the same rate as that of the open voices in the respective groups at the second hierarchy is extracted, a reference pattern having the same main components as those of the respective groups at the second hierarchy is extracted, a reference pattern having the best coincidence as evaluated at the points of +1, 0 and −1 with input patterns of every sample in the respective signal groups at the second hierarchy is extracted, and a common one of said reference patterns obtained in these four steps is selectively extracted.

31. A method according to claim 28 wherein said comparing step (l) is performed by adding an unvoiced sound of a short duration upon presence of a silent sound of a short duration.

32. A speech message recognizing method wherein a speech message is analyzed into a plurality of frequency bands, energies contained in respective said frequency bands are measured and a frequency band distribution of said energies is compared with reference patterns to recognize contents of said message, said method comprising the steps of:
  (a) subjecting said speech message to a logarithmic conversion,
  (b) analyzing said converted speech massage into a first frequency band of 0 to 1 KHz in which energies of voiced sounds concentrate and a second frequency band of 2 to 12 KHz in which energies of unvoiced sounds concentrate,
  (c) preparing voiced and unvoiced sound signals depending on differences between respective energies of voiced sound components belonging to said first frequency band and of unvoiced sound components belonging to said second frequency band,
  (d) shaping said voiced and unvoiced sound signals to produce voiced sound signals $V_p$, unvoiced sound signals $UV_p$ and silent sound signals $S_p$,
  (e) measuring durations of said voiced sound represented by said voiced sound signals $V_p$, durations of said unvoiced sound represented by said unvoiced sound signals $UV_p$ and durations of said silent sound represented by said silent sound signals $S_p$,
  (f) coding the respective signals to produce unvoiced explosive signals PL for unvoiced sound periods of a duration less than a predetermined value and continuing to an unvoiced sound period of a duration above said predetermined value and unvoiced fricative signal F for those of a duration above the predetermined value from said unvoiced sound signals $UV_p$, silent sound signals $S_p$ and measured values of said durations, and another voiced sound signals V from the voiced sound signals $V_p$, and
  (g) comparing said signals coded depending on their contents with said reference patterns to extract one of the reference patterns substantially coinciding with said contents.

33. A method according to claim 32 wherein said coding step (f) is performed so that a binary signal DF is made to correspond to signals V, PL and F having a voiced sound signal V, unvoiced fricative F and unvoiced explosive PL as a set so as to be (0, 0, 0)→(0, 0), (1, 0, 0)→(0, 1), (0, 1, 0)→(1, 1) and (0, 0, 1)→(1, 0).

34. A method according to claim 32 wherein, in said comparing step (g), said measured values of said durations are also compared.

35. A method according to claim 32 wherein, in said shaping step (d), said voiced sound signals $V_p$ are produced only when said voiced and unvoiced sound signals are less than a predetermined value, said unvoiced sound signals $UV_p$ are produced only when they are above another predetermined value, and said silent sound signals $S_p$ are produced only when they are between both of said predetermined values.

36. A speech message recognizing method in which a speech message is analyzed into a plurality of frequency bands, energies contained in respective said frequency bands are measured, and distributions of said energies in the respective frequency bands are compared with respective reference patterns to recognize contents of said speech message, wherein said reference patterns are prepared through a step which comprises the steps of:
  (a) obtaining as a series of inputs said speech message by having the message spoken a plurality of times repeatedly,
  (b) preparing a core of the respective reference patterns with mutually identical and simultaneous pulses of respective said inputs of the message, and
  (c) representing said simultaneous but mutually not identical pulses to be a medium voice VM.

37. A method according to claim 36 wherein said step of preparing said reference patterns further comprises the steps of:
  (d) preparing a first branch of closed voice VC with respect to said medium voice VM when one of respective said inputs of the speech message includes the medium voice VM which is represented as a closed voice VC,
  (e) preparing a second branch of open voice with respect to the medium voice VM when one of the speech inputs includes the medium voice VM represented as the open voice VO, and
  (f) preparing a third branch for maintaining the medium voice VM when the speech inputs include the one in which the medium voice VM becomes the closed voice VC and the one in which VM becomes VO.

38. A speech message recognizing method wherein a speech message is analyzed into a plurality of frequency bands, energies contained in respective said frequency bands are measured, and distributions of said energies in the frequency bands are compared with reference patterns to recognize contents of the speech message, in which said reference patterns are prepared at a step which comprises the steps of:
  (a) adding a branch of medium voice VM when respective voiced sounds of the message start with either one of closed voice VC and open voice VO, said starting voiced sounds other than VC and VO being made as the medium voice VM,
  (b) adding a branch of VM to VC when respective voiced sounds terminate with VC and VO, in the latter case of which VC is added next to VO and a VO branch is added respectively to VO - VC and VO, said terminating voiced sound other than either of VC and VO being made to be VM, and
  (c) adding a branch of VM to VO and VC when VO and VC exist sequentially in the respective voiced sounds of the message, VM being inserted in the absence of said sequential VO and VC.

39. A method according to claim 38 which further comprises the step of:
  (d) adding a branch for short-circuiting S and V upon presence of a portion of sequential silent sound S, unvoiced sound UV and voiced sound V and a branch of UV between S and V upon presence of a sequential S and V portion.

40. A speech message recognizing apparatus wherein a speech message is analyzed into a plurality of frequency bands, energies contained in respective said frequency bands are measured and frequency band distributions of said energies are compared with respective reference patterns to recognize the contents of said speech message, said apparatus comprising:
  (a) means for logarithmically compressing the amplitude of said speech message,
  (b) a first filter bank for selecting voiced sound components belonging to a first one of said frequency bands in which energies of voiced sounds concentrate out of said amplitude-compressed speech message, (c) a second filter bank for selecting unvoiced sound components belonging to a second one of the frequency bands in which energies of unvoiced sounds concentrate out of the speech message, (d) a differential amplifier for producing voiced and unvoiced sound signals by subtracting outputs of said first filter bank from outputs of said second filter bank, (e) an A/D converter for digitalizing outputs of said differential amplifier, said outputs being voiced and unvoiced sound signals, (f) a first memory system for storing said digitalized voiced and unvoiced sound signals, (g) a second memory system for storing reference patterns, and (h) a CPU for causing the digitalized voiced and unvoiced sound signals to be stored in said first memory system and comparing the signals with said reference patterns stored in said second memory system.

41. A speech message recognizing apparatus wherein a speech message is analyzed into a plurality of frequency bands, energies contained in respective said frequency bands are measured and distributions of said energies in said frequency bands are compared with respective reference patterns to recognize contents of said speech message, said apparatus comprising:

(a) means for logarithmically compressing the amplitude of said speech message, (b) a first filter bank in which open voice components belonging to a first one of said first frequency bands in which energies of open voices in voiced sounds concentrate are selected out of said amplitude compressed speech message, (c) a second filter bank in which closed voice components belonging to a second one of the frequency bands in which energies of closed voices in said voiced sounds concentrate are selected out of the amplitude-compressed speech message, (d) a first differential amplifier in which open and closed voice signals are produced by subtracting outputs of said first filter bank from outputs of said second filter bank, (e) an adder in which said outputs of the first and second filter banks are added to each other, (f) a third filter bank in which unvoiced sound components belonging to a third one of the frequency bands in which energies of unvoiced sounds concentrate are selected out of the amplitude-compressed speech message, (g) a second differential amplifier in which voiced and unvoiced sound signals are produced by subtracting outputs of said adder from outputs of said third filter bank, (h) an A/D converter in which said open and closed voice signals and voiced and unvoiced sound signals from said first and second differential amplifiers are digitalized, (i) a first memory system in which said digitalized, open and closed voice signals and voiced and unvoiced sound signals are stored, (j) a second memory system in which reference patterns are stored, and (k) a CPU for causing the digitalized open and closed voice signals and voiced and unvoiced sound signals to be stored in said first memory system and compared with said reference patterns in said second memory system.

42. A speech message recognizing apparatus wherein a speech message is analyzed into a plurality of frequency bands, energies contained in respective said frequency bands are measured, and energy distributions in the respective frequency bands are compared with respective reference patterns to recognize the contents of said speech message, the apparatus comprising:

(a) means for logarithmically compressinq the amplitude of said speech message, (b) a first filter bank in which voiced sound components belonging to a first frequency band in which energies of voiced sounds concentrate are selected out of said amplitude-compressed speech message, (c) a second filter bank in which unvoiced sound components belonging to a second frequency band in which energies of unvoiced sounds concentrate are selected out of the amplitude-compressed speech message, (d) a third filter bank in which open voice components belonging to a third frequency band in which energies of open voices in said voiced sounds concentrate are selected out of the speech message, (e) a fourth filter bank in which closed voice components belonging to a fourth frequency band in which energies of closed voices in the voiced sounds concentrate are selected out of the speech message, (f) a first differential amplifier in which voiced and unvoiced sound signals are produced by subtracting outputs of said first filter bank from outputs of said second filter bank, (g) a second differential amplifier in which open and closed voice signals are produced by subtracting outputs of said third filter bank from outputs of said fourth filter bank, (h) an A/D converter in which said voiced and unvoiced sound signals and open and closed voice signals from said first and second differential amplifiers are digitalized, (i) a first memory system in which the digitalized voiced and unvoiced sound signals and open and closed voice signals are stored, (j) a second memory system in which reference patterns are stored, and (k) a CPU which causes the digitalized voiced and unvoiced signals and open and closed voice signals to be stored respectively in said first and second memory systems and to be compared with said reference patterns.

43. A speech message recognizing apparatus which analyzes a given speech message into a plurality of frequency bands, measures energies contained in respective said frequency bands and compares energy distributions in the respective frequency bands with reference patterns to recognize the contents of said speech message, the apparatus comprising:

(a) means for logarithmically compressing the amplitude of said speech message, (b) a first filter bank for selecting out of said amplitude-compressed speech message, energy components distributed in a first one of the frequency bands in which voiced sound energies concentrate, (c) a second filter bank for selecting out of the amplitude-compressed speech message, energy components distributed in a second one of the frequency bands in which unvoiced sound energies concentrate, (d) a differential amplifier for producing voiced and unvoiced sound signals by subtracting outputs of said first filter bank from outputs of said second filter bank, (e) a pulse encoder for coding said voiced and unvoiced sound signals from said differential amplifier, (f) a first memory system for storing the coded voiced and unvoiced sound signals, (g) a second memory system for storing said reference patterns, and (h) a CPU for having the coded voiced and unvoiced sound signals stored in said first memory system and compared with the reference patterns stored in said second memory system.

44. A speech message recognizing apparatus wherein a speech message is analyzed into a plurality of frequency bands, energies contained in respective said frequency bands are measured and distributions of said energies in said frequency bands are compared with respective reference patterns to recognize contents of said speech message, said apparatus comprising:

(a) means for logarithmically compressing the amplitude of said speech message, (b) a first filter bank in which open voice components belonging to a first one of said first frequency bands in which energies of open voices in voiced sounds concentrate are selected out of said amplitude-compressed speech message, (c) a second filter bank in which closed voice components belonging to a second one of the frequency bands in which energies of closed voices in said voiced sounds concentrate are selected out of the amplitude-compressed speech message, (d) a first differential amplifier in which open and closed voice signals are produced by subtracting outputs of said first filter bank from outputs of said second filter bank, (e) an adder in which said outputs of the first and second filter banks are added to each other, (f) a third filter bank in which unvoiced sound components belonging to a third one of the frequency bands in which energies of unvoiced sounds concentrate are selected out of the amplitude-compressed speech message, (g) a second differential amplifier in which voiced and unvoiced sound signals are produced by subtracting outputs of said adder from outputs of said third filter bank, (h) a pulse encoder in which said open and closed voice signals and voiced and unvoiced sound signals from said first and second differential amplifiers are coded, (i) a first memory system in which the open and closed voice signals and voiced and unvoiced sound signals respectively coded are stored, (j) a second memory sysem in which reference patterns are stored, and (k) a CPU for causing the coded open and closed voice signals and voiced and unvoiced sound signals to be stored in said first memory system and compared with said reference patterns in said second memory system.

45. A speech message recognizing apparatus whereby a speech message is analyzed into a plurality of frequency bands, energies contained in respective said frequency bands are measured, and energy distributions in the respective frequency bands are compared with respective reference patterns to recognize the contents of said speech message, the apparatus comprising:

(a) means for logarithmically compressing the amplitude of said speech message, (b) a first filter bank in which voiced sound components belonging to a first frequency band in which energies of voiced sounds concentrate are selected out of said amplitude-compressed speech message, (c) a second filter bank in which unvoiced sound components belonging to a second frequency band in which energies of unvoiced sounds concentrate are selected out of the amplitude-compressed speech message, (d) a third filter bank in which open voice components belonging to a third frequency band in which energies of open voices in said voiced sounds concentrate are selected out of the speech message, (e) a fourth filter bank in which closed voice components belonging to a fourth frequency band in which energies of closed voices in the voiced sounds concentrate are selected out of the speech message, (f) a first differential amplifier in which voiced and unvoiced sound signals are produced by subtracting outputs of said first filter bank from outputs of said second filter bank, (g) a second differential amplifier in which open and closed voice signals are produced by subtracting outputs of said third filter bank from outputs of said fourth filter bank, (h) a pulse encoder in which said voiced and unvoiced sound signals and open and closed voice signals from said first and second differential amplifiers are coded, (i) a first memory system in which the coded voiced and unvoiced sound signals and open and closed voice signals are stored, (j) a second memory system in which reference patterns are stored, and (k) a CPU which causes the coded voiced and unvoiced signals and open and closed voice signals to be stored in said first memory system and to be compared with said reference patterns.

46. A speech message recognizing apparatus which analyzes a given speech meseage into a plurality of frequency bands, measures energies contained in respective said frequency bands and compares energy distributions in the respective frequency bands with reference patterns to recognize the contents of said speech message, the apparatus comprising:

(a) means for logarithmically compressing the amplitude of said speech message, (b) a first filter bank for selecting out of said amplitude-compressed speech message, energy components distributed in a first one of the frequency bands in which voiced sound energies concentrate, (c) a second filter bank for selecting out of the amplitude-compressed speech message, energy components distributed in a second one of the frequency bands in which unvoiced sound energies concentrate,

[(d) a differential amplifier for producing voiced and unvoiced sound signals by subtracting outputs of said first filter bank from outputs of said second filter bank, (e) an averaging circuit for averaging outputs of said differential amplifier, (f) a first discriminating circuit for providing a high level output only when output of said averaging circuit is smaller than a predetermined value, (g) a second discriminating circuit for providing a high level output only when said output of the averaging circuit is larger than another predetermined value, (h) a shaping circuit for producing voiced sound signals $V_p$, unvoiced sound signals $UV_p$ and silent sound signals $S_p$ from respective said outputs of said first and second discriminating circuits, (i) a first counter for counting durations of said voiced sounds represented by said voiced sound signals $V_p$ and of unvoiced sounds represented by said unvoiced sound signals $UV_p$, (j) a second counter for counting durations of said silent sounds represented by said silent sound signals $S_p$, (k) a comparing circuit for comparing the counted value of said first counter with a predetermined value and providing a high leval output only when said counted value exceeds said predetermined value, (l) a coding circuit for producing from a set of signals V, PL and F comprising a first signal V which is on a high level only when the voiced sound signal $V_p$ is on a high level and when outputs of said comparing circuit are on a high level, a second signal PL which is on a high level only when said outputs of the comparing circuit corresponding to said unvoiced sound signals $UV_p$ sequentially appearing in silent sound period of which the counted value of said second counter exceeds a predetermined value are on a low level and a third signal F which is on a high level only when the outputs of the comparing circuit corresponding to the unvoiced sound signals $UV_p$ sequentially appearing in said silent sound period of which the counted value of the second counter exceeds the predetermined value are on a high level, a set of coded signals $DF_1$ and $DF_0$ of a logic sum signal $DF_0$ of said second signal PL and third signal F and a logic sum signal $DF_1$ of said first signal V and third signal F, (m) a first memory system for storing said coded signals $DF_1$ and $DF_0$, (n) a second memory system for storing the counted contents of the first and second counters corresponding to the coded signals $DF_1$ and $DF_0$, (o) a third memory system for storing reference patterns, and (p) a CPU for causing the code signals $DF_1$ and $DF_0$ and counted contents of the first and second counters to be stored respectively in said first and second memory systems and compared with said reference patterns stored in said third memory system.

47. A speech message recognizing apparatus which analyzes a given speech message into a plurality of frequency bands, measures energies contained in respective said frequency bands and compares energy distributions in the respective frequency bands with reference patterns to recognize the contents of said speech message, the apparatus comprising:

(a) means for logarithmically compressing the amplitude of said speech message, (b) a first filter bank for selecting out of said amplitude-compressed speech message, energy components distributed in a first one of the frequency bands in which voiced sound energies concentrate, (c) a second filter bank for selecting out of the amplitude-compressed message, energy components distributed in a second one of the frequency bands in which unvoiced sound energies concentrate, (d) a first differential amplifier for producing voiced and unvoiced sound signals by subtracting outputs of said first filter bank from outputs of said second filter bank, (e) a first averaging circuit for averaging outputs of said first differential amplifier, (f) a first discriminating circuit for providing a high level output only when output of said first averaging circuit is smaller than a predetermined value, (g) a second discriminating circuit for providing a high level output only when said output of the first averaging circuit is larger than another predetermined value, (h) a first shaping circuit for producing voiced sound signals $V_p$, unvoiced sound signals $UV_p$ and silent sound signals $S_p$ from respective said outputs of said first and second discriminating circuits, (i) a first counter for counting durations of said voiced sounds represented by said voiced sound signals $V_p$ and of unvoiced sounds represented by said unvoiced sounds signals $UV_p$, (j) a second counter for counting durations of said silent sounds represented by said silent sound signals $S_p$, (k) a first comparing circuit for comparing the counted value of said first counter with a predetermined value and providing a high level output only when said counted value exceeds said predetermined value, (l) a first coding circuit for producing from a set of signals V, PL and F comprising a first signal V which is on a high level only when the voiced sound signal $V_p$ is on a high level and when the output of said first comparing circuit is on a high level, a second signal PL which is on a high level only when said outputs of the first comparing circuit corresponding to said unvoiced sound signals $UV_p$ sequentially appearing in silent sound period of which the counted value of said second counter exceeds a predetermined value are on a low level and a third signal F which is on a high level only when the outputs of the first comparing circuit corresponding to the unvoiced sound signals $UV_p$ sequentially appearing in said silent sound period of which the counted value of the second counter exceeds the predetermined value are on a high level, a set of coded signals $DF_1$ and $DF_0$ of a logic sum signal $DF_0$ of said second signal PL and third signal F and a logic sum signal $DF_1$ of said first signal V and third signal F, (m) a third filter bank for selecting out of the speech message, energy components distributed in a third one of the frequency bands in which open voice energies concentrate, (n) a fourth filter bank for selecting out of the speech message, energy components distributed in a fourth one of the frequency bands in which closed voice energies concentrate, (o) a second differential amplifier for producing open and closed voice signals by subtracting outputs of said third filter bank from outputs of said fourth filter bank, (p) a second averaging circuit for averaging outputs of said second differential amplifier, (q) a third discriminating circuit for providing a high level output only when the output of said second averaging circuit is smaller than a predetermined value, (r) a fourth discriminating circuit for providing a high level output only when said output of the second averaging circuit is larger than another predetermined value, (s) a second shaping circuit for producing open voice signals $VO_p$ and closed voice signals $VC_p$ from respective said outputs of said third and fourth discriminating circuits, (t) a third counter for counting durations of said open voices represented by said open voice signals $VO_p$ and of closed voices represented by said closed voice signals $VC_p$, (u) a second comparing circuit for comparing counted value of said third counter with a predetermined value and providing a high level output only when said counted value exceeds said predetermined value, (v) a second coding circuit for producing a set of signals $DF_3$ and $DF_2$ wherein a fourth signal VO which is on a high level only when the open voice signals $VO_p$ are on the high level and said outputs of said second comparing circuit are on the high level and a fifth signal VC which is on the high level only when the closed voice signals $VC_p$ are on the high level and the outputs of the second comparing circuit are on the high level are made to be said signals $DF_3$ and $DF_2$, respectively, (w) a first memory system for storing said coded signals $DF_3$, $DF_2$, $DF_1$ and $DF_0$, (x) a second memory system for storing counted contents of the first through third counters corresponding to the coded signals $DF_3$, $DF_2$, $DF_1$ and $DF_0$, (y) a third memory system for storing reference patterns, and (z) a CPU for causing the coded signals $DF_3$, $DF_2$, $DF_1$ and $DF_0$ and counted contents of the first through third counters to be stored respectively in said first and second memory systems and compared with said reference patterns stored in said third memory system.

48. A speech message recognizing apparatus which analyzes a speech message into a plurality of frequency bands, measures respective energies contained in respective said frequency bands and compares energy distributions in the frequency bands with reference patterns to recognize the contents of said speech message, the apparatus comprising:

(a) means for subjecting said speech message to a logarithmic conversion, (b) a first filter bank for selecting energy components in a range of 0 to 0.5 KHz of said converted message, (c) a second filter bank for selecting energy components in a range of 0.5 to 1.0 KHz of the converted message, (d) a third filter bank for selecting energy components in a range of 0.8 to 1.8 KHz of the converted message, (e) a fourth filter bank for selecting energy components in a range of 1.8 to 3.2 KHz of the converted message, (f) a fifth filter bank for selecting energy components in a range of 5 to 12 KHz of the converted message, (g) a first differential amplifier for subtracting outputs of said first and second filter banks simultaneously from outputs of said fifth filter bank, (h) a second differential amplifier for subtracting said outputs of the first filter bank from said outputs of the second filter bank, (i) a third differential amplifier for subtracting outputs of said third filter bank from outputs of said fourth filter bank, (j) a plurality of discriminating circuits producing discriminating outputs from respective outputs of said first to third differential amplifiers, (k) a first memory circuit for storing outputs of said discriminating circuits, (l) a second memory circuit storing said reference patterns, and (m) a CPU for having the respective outputs of the discriminating circuits stored in said first memory circuit and compared with the respective reference patterns.

* * * * *